US006777606B2

(12) United States Patent
Kira

(10) Patent No.: US 6,777,606 B2
(45) Date of Patent: Aug. 17, 2004

(54) AUTOMATIC ACCOMPANYING APPARATUS OF ELECTRONIC MUSICAL INSTRUMENT

(75) Inventor: Yoshifumi Kira, Hamamatsu (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 14 days.

(21) Appl. No.: 10/284,034

(22) Filed: Oct. 29, 2002

(65) Prior Publication Data

US 2003/0110927 A1 Jun. 19, 2003

(30) Foreign Application Priority Data

Oct. 30, 2001 (JP) ....................................... 2001-333455

(51) Int. Cl.[7] ............................. G01H 1/38; G01H 7/00

(52) U.S. Cl. .............................. 84/613; 84/721; 84/746

(58) Field of Search .......................... 84/613, 637, 669, 84/721, 746

(56) References Cited

U.S. PATENT DOCUMENTS 5,260,510 A * 11/1993 Shibukawa .................. 84/637
5,777,253 A * 7/1998 Kurebayashi ................ 84/613
6,380,475 B1 * 4/2002 Kira ............................ 84/637

* cited by examiner

*Primary Examiner*—Jeffrey Donels
(74) *Attorney, Agent, or Firm*—Christie, Parker & Hale, LLP

(57) ABSTRACT

In an electronic musical instrument, a key operation detecting section detects a key operation on a keyboard, and the hand key operation contains a key pushing operation and a key releasing operation. A control unit detects a chord of a chord part in response to the key pushing operation and the key releasing operation. Then, the control unit generates chord control data for a re-trigger operation based on the detected chord of the chord part, when the key operation is the key pushing operation. A sound generating section generates a new accompaniment sound based on the chord control data and automatic accompaniment data stored in a memory section in the re-trigger operation.

20 Claims, 19 Drawing Sheets

BASIC CHORD PATTERN

BASIC BASS PATTERN

INTENTION OF PLAYER

OPERATION EAC ON →G ON→A OFF
PUSHED STATE EAC EGAC EGC
CHORD Am C

OPERATION WITHOUT OFF DETECTION

OPERATION EAC ON →G ON→A OFF
PUSHED STATE EAC EGAC EGC
CHORD Am Am7

OPERATION WITHOUT ON DETECTION

OPERATION EAC ON →G ON→A OFF
PUSHED STATE EAC EGAC EGC
CHORD Am Am7 C

STEP COUNTING PROCESS

Fig. 18

BASS BEND VALUE TABLE

| DIFFERENCE FROM NEW BASS ROOT (SEMITONE) | BEND VALUE (SEMITONE) |
|---|---|
| -11 | +1 |
| -10 | +2 |
| -9 | +3 |
| -8 | +4 |
| -7 | +5 |
| -6 | +6 |
| -5 | -5 |
| -4 | -4 |
| -3 | -3 |
| -2 | -2 |
| -1 | -1 |
| 0 | 0 |
| 1 | +1 |
| 2 | +2 |
| 3 | +3 |
| 4 | +4 |
| 5 | +5 |
| 6 | +6 |
| 7 | -5 |
| 8 | -4 |
| 9 | -3 |
| 10 | -2 |
| 11 | -1 |

AUTOMATIC ACCOMPANYING APPARATUS OF ELECTRONIC MUSICAL INSTRUMENT

CROSS-REFERENCE TO RELATED APPLICATION

This application claims priority of Japanese Patent Application Number 333455/2001, filed Oct. 30, 2001.

BACKGROUND OF THE INVENTION

1. Field of the Invention

The present invention relates to an automatic accompanying apparatus of an electronic musical instrument which generates accompaniment sound based on a chord detected in accordance with an operation of a keyboard. More particularly, the present invention is directed to the technique to control re-generation of the accompaniment sound (hereinafter, to be referred to also as "re-trigger") in accordance with the detected chord.

2. Description of the Related Art

In recent years, an electronic musical instrument with an automatic accompanying apparatus has been developed. An electronic musical instrument is known in which a keyboard is grouped into a chord detection keyboard portion and a general performance keyboard portion. In such an electronic musical instrument, a chord is detected in accordance with an operation of the chord detection keyboard portion to generate accompaniment sound automatically, whereas usual musical sound is generated in accordance with an operation of the general performance keyboard portion.

In the automatic accompanying apparatus, the accompaniment sound is generated as follows. The chord detection is first carried out in accordance with the pushing operation of a few keys of the chord detection keyboard portion. In the chord detection, a chord root, a chord type and a bass root are detected. Subsequently, automatic accompaniment data which has been previously stored in a memory is read. When a step time value contained in the read out automatic accompaniment data is coincident with a value counted by a step time counter which is separately provided, the time is determined to be a sound generation time. The automatic accompaniment data is developed in accordance with the previously detected chord. Then, sound data showing the chord component sounds obtained through the development is sent to a sound source and the accompaniment sound is generated.

The above processes is carried out to generate such accompaniment sound every time a player pushes a few keys of the chord detection keyboard portion. In this way, the player pushes the keys of the chord detection keyboard portion sequentially in accordance with a predetermined pattern, and the accompaniment sound can be generated sequentially in accordance with the key pushing operation.

However, in the above-mentioned conventional automatic accompanying apparatus, the generation of the accompaniment sound is not carried out at the time when the player operates the chord detection keyboard portion. The generation of the accompaniment sound is postponed until the sound generation time specified by the step time in the automatic accompaniment data. In other words, the change of the chord of the accompaniment sound is carried out synchronously to the change of the automatic accompaniment data.

In addition, in another conventional automatic accompanying apparatus, the sound generation is not carried out until the accompaniment progresses to the head of the next measure. The change of the chord of the accompaniment sound is carried out synchronously to the change of the measure.

In this way, in the conventional automatic accompanying apparatuses, it is difficult to carry out the performance because the time when the key is pushed and the time (hereinafter, say "the sound generation time") that the sounds composed of a chord (hereinafter, to be referred to as "chord component sounds") are generated do not coincide with each other.

In order to solve the above problems, an automatic accompanying apparatus was developed to have a re-trigger function. In the re-trigger function of the automatic accompanying apparatus, currently generated chord component sounds are extinguished at the time when a key is pushed, and a new chord is detected, even if the time is not the sound generation time, and the sound generation of the chord component sounds corresponding to the detected chord is carried out again. By using the re-trigger function, because the chord component sounds are changed at the time when the key is pushed, it is possible to change the chord smoothly to match to sense of the player.

By the way, when a chord performance is carried out by use of a musical instrument such as an organ which generates sustain sound, a part of pushed keys is often pushed again in the chord change. In this case, the chord detection intended by the player is not carried out frequently, as described below. Therefore, an automatic accompanying apparatus was developed in which the chord detection is not only carried out at the time when a key is pushed (hereinafter, to be referred to as "ON detection") but also the chord detection is carried out at the time when the key is released (hereinafter, to be referred to as "OFF detection").

The operation in this case will be described with reference to FIGS. 1A to 1E. FIG. 1A shows a basic chord pattern with C as a key of the automatic accompaniment data stored in a memory. FIG. 1B shows another basic bass pattern. A case where automatic accompaniment of a bass part is carried out will be described below to avoid complexity of the description.

FIG. 1C shows an accompaniment pattern of the bass part intended by the player. The player pushes the keys of "E", "A" and "C" at the start of the first measure to specify a chord Am. Thus, a bass sound is generated in the sound pitch of "A" at the basic bass pattern sound generation time of the first beat. The key pushing state (the state in which the keys of "E", "A" and "C" are pushed) is continued, and then the next bass sound is generated in the sound pitch of "A" at the basic bass pattern sound generation time of the third beat. Subsequently, the player releases the key of "A" and pushes the key of "G" at the end of the first measure to specify a chord C. Thus, because the keys of "C", "E" and "G" have been pushed, the chord C is detected. The bass sound is generated in the sound pitch of "C" at the time of the first beat of the second measure of the basic bass pattern.

With the above-mentioned intention of the player, in the automatic accompanying apparatus which does not carry out the OFF detection, the ON detection is carried out at the time when the player pushes the key of "G" at the end of the first measure and the chord Am7 is detected, as shown in FIG. 1D. Because the OFF detection is not carried out even if the player releases the key of "A" after that, the state after the chord Am7 is detected continues. At the time of the first beat of the second measure of the basic bass pattern, a bass sound is generated in the sound pitch of "A". That is, the sound of "A" which is different from the sound of "C" intended by the player is generated.

On the other hand, in the automatic accompanying apparatus which carries out the OFF detection, the ON detection is carried out when the player pushes the key of "G", at the end of the first measure and the chord Am7 is detected, as shown in FIG. 1E. After that, when the player releases the key of "A", the chord C is detected because the OFF detection is carried out in the state in which the keys of "E", "G" and "C" are pushed. As a result, a bass sound is generated in the sound pitch of "C" at the time of the first beat of the second measure of the basic bass pattern. That is, the sound coincident with the intention of the-player is generated.

However, in the automatic accompanying apparatus with the re-trigger function, when the automatic accompanying apparatus carries out the OFF detection, the re-trigger operation is carried out at the time when a key is pushed in addition to the time when the key is released. This state will be described with reference to FIGS. 2A to 2C.

FIG. 2A show a basic bass pattern with C as a key stored in a memory as the automatic accompaniment data. In FIG. 2A, a white triangular mark indicates a time that the generation of the bass sound is started in accordance with the basic bass pattern, i.e., a trigger position.

FIG. 2B shows a bass pattern intended by the player. In FIG. 2B, a black triangular mark indicates a time that the generation of the bass sound is started at the time when the key is pushed, i.e., a re-trigger position. The player pushes the keys of "E", "A" and "C" in the start of the first measure to specify the chord Am. In this way, the trigger operation is carried out at the time of the first beat of the basic bass pattern and a bass sound is generated in the sound pitch of "A". If the key pushing state (the state in which the keys of "E", "A" and "C" are pushed) continues, a trigger is again carried out at the time of the third beat of the basic bass pattern and a next bass sound is generated in the sound pitch of "A". Subsequently, when the player releases the keys of "E" and "A" in the fourth beat and pushes the keys of "F" and "A", the chord F is detected because the keys of "F", "A" and "C" are pushed. As a result, the re-trigger operation is carried out at the time of the fourth beat based on the re-trigger function and a bass sound is generated in the sound pitch of "F".

With the above-mentioned intention of the player, only the key of "C" is in the pushed state when the player releases the keys of "E" and "A" at the time delayed from the third beat of the first measure by a half beat, as shown in FIG. 2C. Therefore, the chord C is detected through the OFF detection. As a result, the re-trigger is carried out at the time delayed from the third beat by a half beat and a bass sound is generated in the sound pitch of "C". Subsequently, when the player pushes the keys of "F" and "A" in the fourth beat, the keys of "F", "A" and "C" are in the pushed state. Therefore, the chord F is detected through the ON detection. As a result, the re-trigger is carried out at the time of the fourth beat and a bass sound with the sound pitch of "F" is generated.

As described above, in the automatic accompanying apparatus with the re-trigger function and the OFF detection function, the re-trigger is carried out at the time delayed from the third beat of the first measure by a half beat, as shown in FIG. 2C, but the re-trigger is not intended by the player. As a result, the bass sound is frequently generated unintentionally by the player and hinders the performance.

SUMMARY OF THE INVENTION

Therefore, an object of the present invention is to provide an automatic accompanying apparatus of an electronic musical instrument in which it is possible to generate accompaniment sound coincident with the intention of a player.

In order to achieve the above object, the automatic accompanying apparatus of the electronic musical instrument of the present invention is composed of a keyboard, a chord detecting section which detects a chord when a key of the keyboard is pushed or released, a storage section which stores automatic accompaniment data which contains sound generation times, and a control unit which controls a re-trigger operation in which at one of the sound generation times of the automatic accompaniment data stored in the storage section, the automatic accompaniment data is developed in accordance with the chord detected by the chord detecting section such that an accompaniment sound is generated, and only when the key is pushed at a time other than the sound generation times, the accompaniment sound currently generated is extinguished, and an accompaniment sound is generated in accordance with the chord detected by the chord detecting section.

According to the structure, the chord detection is carried out at the two times when the key of the keyboard is pushed and is released. However, the re-trigger operation is carried out only when the key is pushed and it is not carried out when the key is released. Therefore, the generation of the accompaniment sound through the re-trigger operation not intended by the player is restrained. Thus, it is possible to generate the accompaniment sound in accordance with the intention of the player.

In the automatic accompanying apparatus of the electronic musical instrument, the accompaniment sound may be at least one component sound of a chord part and a bass part, i.e., at least one of the component sounds in the chord part, the component sounds in the bass part and the component sounds of both the chord part and the bass part.

At the sound generation time of the automatic accompaniment data stored in the storage section, the control unit of the automatic accompanying apparatus of the electronic musical instrument develops the automatic accompaniment data into the component sounds of the chord detected by the chord detecting section such that the component sounds of the chord part are generated, and extinguishes component sounds, not contained in the chord detected by the chord detecting section, from of the component sounds of the chord part currently generated, such that the generation of the remaining component sounds are continued as the component sounds of a new chord part, only when the key is released at the time other than the sound generation times.

According to the structure, when the key is released, the re-trigger operation is not carried out. However, of the component sounds currently generated of the chord part, the component sounds not contained in the chord detected by the chord detecting section are extinguished. Therefore, because re-generation of the accompaniment sound through the re-trigger operation is not carried out, the sound with an attack is never generated. Also, unnaturalness can be avoided that any sound other than the component sounds of the chord is generated.

Also, the control unit in the automatic accompanying apparatus of the electronic musical instrument may develop the automatic accompaniment data into the component sounds of the chord detected by the chord detecting section such that the component sounds of a bass part are generated at the sound generation time of the automatic accompaniment data stored in the storage section, and extinguish the component sounds other than a specific one of the component sounds currently generated of the bass part and bends the specific sound temporarily such that a pitch of the specific component sound becomes same as a root sound of the chord detected by the chord detecting section, only when the key is released at the time other than the sound generation times. In this case, the specific sound may be the lowest one of the component sounds of the bass part.

According to the structure, when the key is released, the component sounds other than the specific sound are extinguished of the component sounds currently generated of the bass part. The bend is temporarily carried out such that the pitch of the specific component sound become same as that of the root sound of the chord detected by the chord detecting section. Therefore, the re-generation of the component sounds of the bass part as the result of the re-trigger operation is not carried out. Thus, unnaturalness can be avoided because the bass sound with an attack is never generated and the interval is smoothly switched.

Also, the automatic accompanying apparatus of the electronic musical instrument is further composed of a leg keyboard, and the accompaniment sound is composed of the sound of the chord part and the sound of bass part. When any of the leg keyboard is operated and the root sound of the chord detected by the chord detecting section is not changed, the control unit does not carry out the re-trigger operation of the bass part and carries out only the re-trigger operation of the chord part.

According to the structure, when the leg keyboard is operated, the re-trigger operation of the bass part is not carried out and only the re-trigger operation of the chord part is carried out, in case that the root sound is not changed. As a result, it is possible to apply the trigger operation through the operation of the leg keyboard to the bass part and the trigger operation through the operation of the hand keyboard to the chord part. Therefore, in a fractional chord performance, it is possible to separate the control of the bass part by the leg keyboard and the control of the chord part by the hand keyboard. Thus, the response of the automatic accompaniment through the chord detection can be brought closer to the intention of the player.

Moreover, the automatic accompanying apparatus of the electronic musical instrument may be further composed of a leg keyboard. The accompaniment sound contains a bass part. The chord detecting section detects a key of the leg keyboard pushed in the end as the bass root. When the bass root is detected by the chord detecting section, the control unit carries out the re-trigger operation if the generated sound is contained in the bass part and is a root sound. If the generated sound is not contained in the bass part, the sound of the bass part is generated in accordance with a gate time, a velocity and a gate time which are contained in the automatic accompaniment data which defines the sounds of the bass part generated last and a note number of the root sound.

BRIEF DESCRIPTION OF THE DRAWINGS

FIG. 18 is a diagram showing a bass bend value table used in a bass part pitch changing process carried out in the chord detecting process shown in FIGS. 15A to 15C.

DESCRIPTION OF THE PREFERRED EMBODIMENTS

Hereinafter, an automatic accompanying apparatus of an electronic musical instrument according to the present invention will be described in detail with reference to the attached drawings.

Figure 1A:
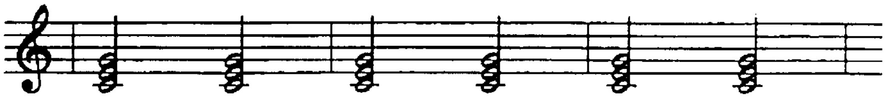
Fig. 1A PRIOR ART
FIGS. 1A to 1E are diagrams showing the operation of chord detection in a conventional automatic accompanying apparatus.
Figure 1B:
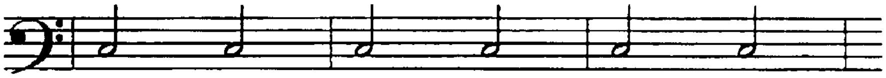
Fig. 1B PRIOR ART
Figure 1C:
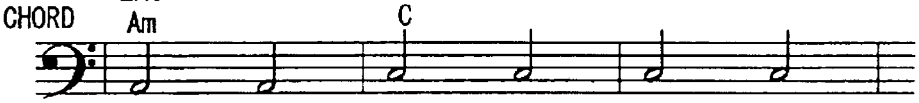
Fig. 1C PRIOR ART
Figure 1D:
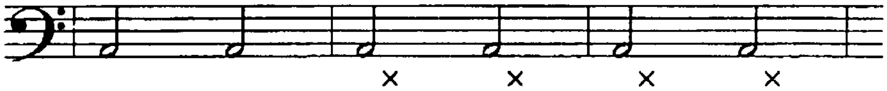
Fig. 1D PRIOR ART
Figure 1E:
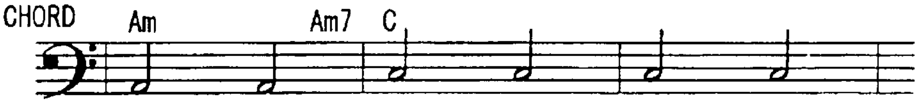
Fig. 1E PRIOR ART
Figure 2A:
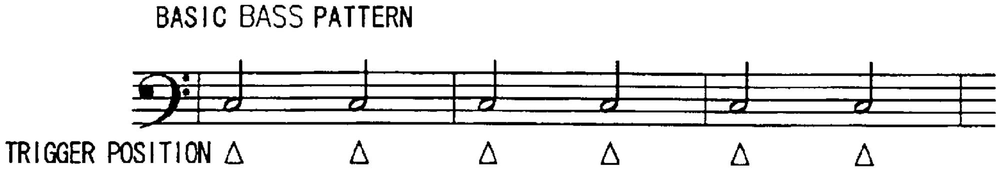
Fig. 2A PRIOR ART
FIGS. 2A to 2C are diagrams showing the operation of a re-trigger operation in the conventional automatic accompanying apparatus.
Figure 2B:
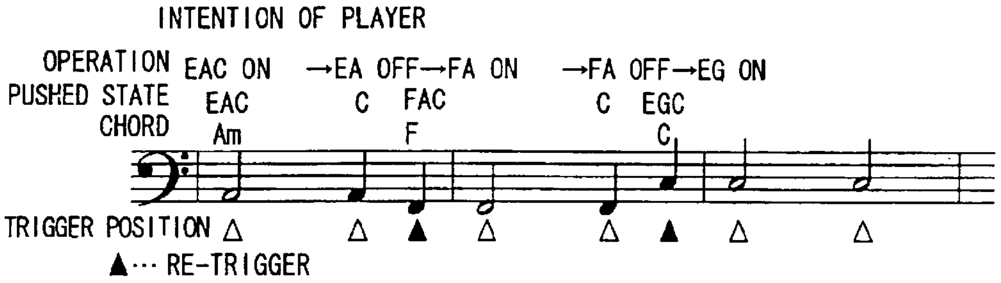
Fig. 2B PRIOR ART
Figure 2C:
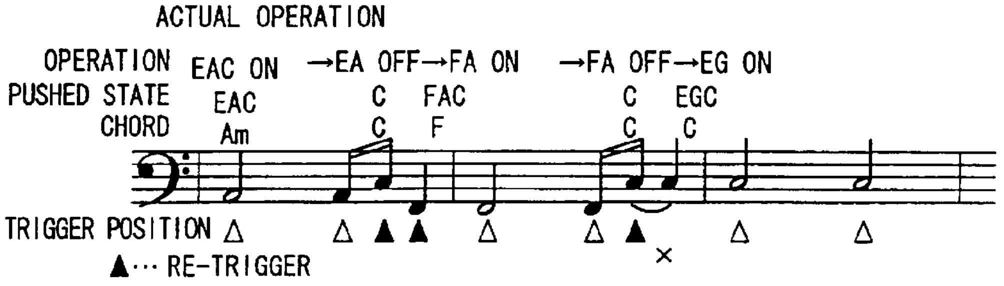
Fig. 2C PRIOR ART
Figure 3:
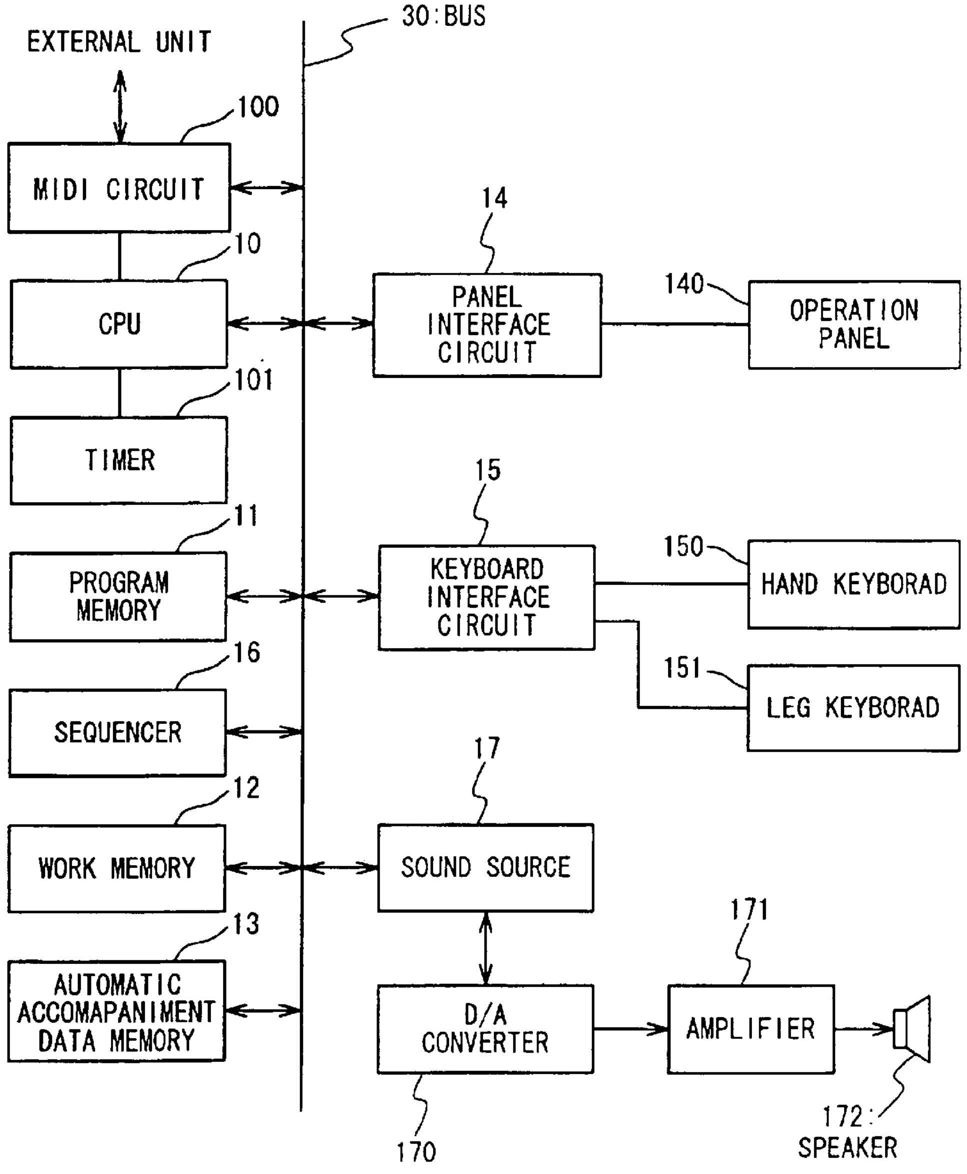
FIG. 3 is a block diagram showing the structure of an automatic accompanying apparatus of an electronic musical instrument according to a first embodiment of the present invention.

FIG. 3 is a block diagram showing the structure of the automatic accompanying apparatus of the electronic musical instrument according to the first embodiment of the present invention. The electronic musical instrument is composed of a central processing unit (hereinafter, to be referred to as "CPU") 10, a program memory 11, a work memory 12, an automatic accompaniment data memory 13, a panel interface circuit 14, a keyboard interface circuit 15, a sequencer 16, and a sound source 17. The above components are mutually connected to a bus 30, and an address signal, a data signal, and a control signal are transferred on the bus between the above components.

The CPU 10 corresponds to a chord detecting section and a control unit of the present invention. The CPU 10 carries out processes to realize the functions of the electronic musical instrument, containing an automatic accompaniment function, in accordance with a control program stored in the program memory 11. A MIDI (Musical Instrument Digital Interface) circuit 100 is connected with the CPU 10. The MIDI circuit 100 converts MIDI data supplied from the CPU 10 into a MIDI signal which meets the MIDI standard, and outputs it to an external unit. Also, the MIDI circuit 100 converts a MIDI signal supplied from the external unit into MIDI data and sends it to the CPU 10. As the external unit, another electronic musical instrument or a computer may be used, for example. Also, a timer 101 is connected to the CPU 10. The timer 101 generates an interrupt signal at every predetermined time and sends it to the CPU 10. The CPU 10 carries out a key operation of removing chattering caused in chord detection to two or more keys in response to the interrupt signal (to be described later in detail).

As the program memory 11, a ROM (Read Only Memory) may be used, for example. The program memory 11 stores the above-mentioned control program, various predetermined data used by the CPU 10, and tone parameters for specifying tones. The tone parameter is provided for each of a plurality of sound ranges for each of a plurality of musical instruments. Each tone parameter is composed of a waveform address, frequency data, envelope data, and filter coefficients.

As the work memory 12, a RAM (Random Access Memory) may be used, for example. The work memory 12 temporarily stores various data to be processed by the CPU 10. Tables, buffers, registers, counters, and flags are provided for the work memory 12. The tables are such as a chord detection table, a leg key conversion table, and a bass bend value table. The buffers are such as a buffer for re-trigger operation, and a chord buffer. The registers are such as a temporary register, and a chord register. The counters are such as an ON detection request counter, an OFF detection request counter, a clock counter, a step time counter, a beat counter, and a measure counter. The flags are such as an automatic accompaniment flag, a sequencer replay flag, a sequencer recording flag, a rhythm selection flag, an introduction flag, a fill-in flag, an ending flag, a bass detection request flag, an ON detection request flag, an OFF detection request flag, a chord part re-trigger operation request flag, and a bass part re-trigger operation request flag. The details of them will be described below as needed.

Figure 4:
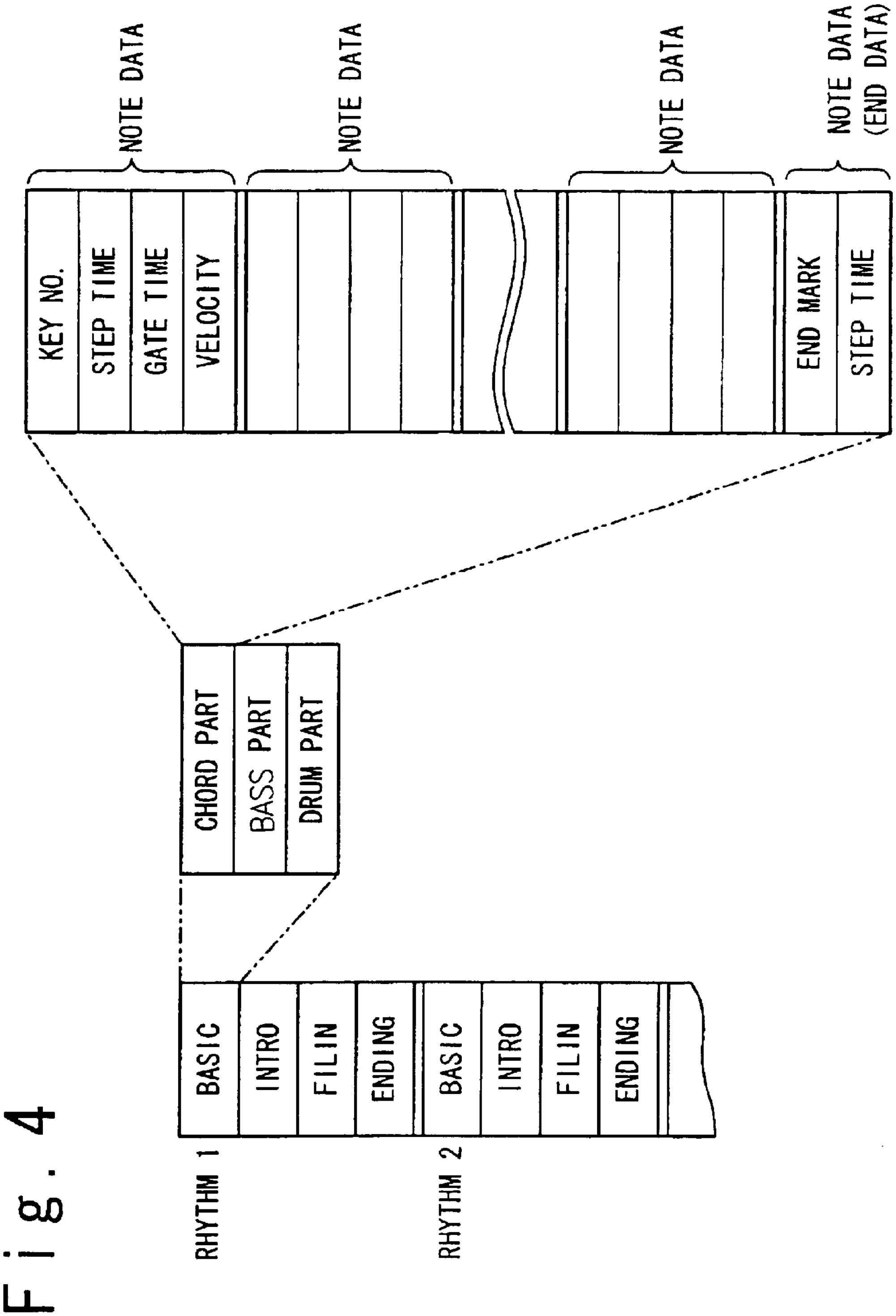
FIG. 4 is a diagram showing the structure of automatic accompaniment data used in the automatic accompanying apparatus according to the first embodiment of the present invention.

The automatic accompaniment data memory 13 corresponds to a storage section of the present invention. As the automatic accompaniment data memory 13, a ROM may be used, for example. The automatic accompaniment data memory 13 stores a plurality of automatic accompaniment data corresponding to the plurality of rhythm, respectively. The automatic accompaniment data of each rhythm is composed of pattern data such as basic pattern data (BASIC), introduction pattern data (INTRO), fill-in pattern data (FILIN) and ending pattern data (ENDING), as shown in FIG. 4.

The basic pattern data is used to generate a basic accompaniment pattern of a concerned rhythm. The introduction pattern data is used to generate an introduction accompaniment pattern. The fill-in pattern data is used to generate a fill-in accompaniment pattern. The ending pattern data is used to generate an ending accompaniment pattern. Each pattern data is composed of part data for three parts such as a chord part, a bass part and a drum part. Each part data is composed of note data for a few measures and one end data.

Each note data is composed of 4 bytes of a key number, a step time, a gate time and a velocity. The key number specifies a sound pitch, and the step time specifies sound generation times. The gate time specifies a generation duration time of the generated sound, and the velocity specifies an intensity of the generated sound. Also, the end data is composed of 2 bytes of an end mark and a step time. The end mark shows the end of an automatic accompaniment data in one part.

Figure 5:
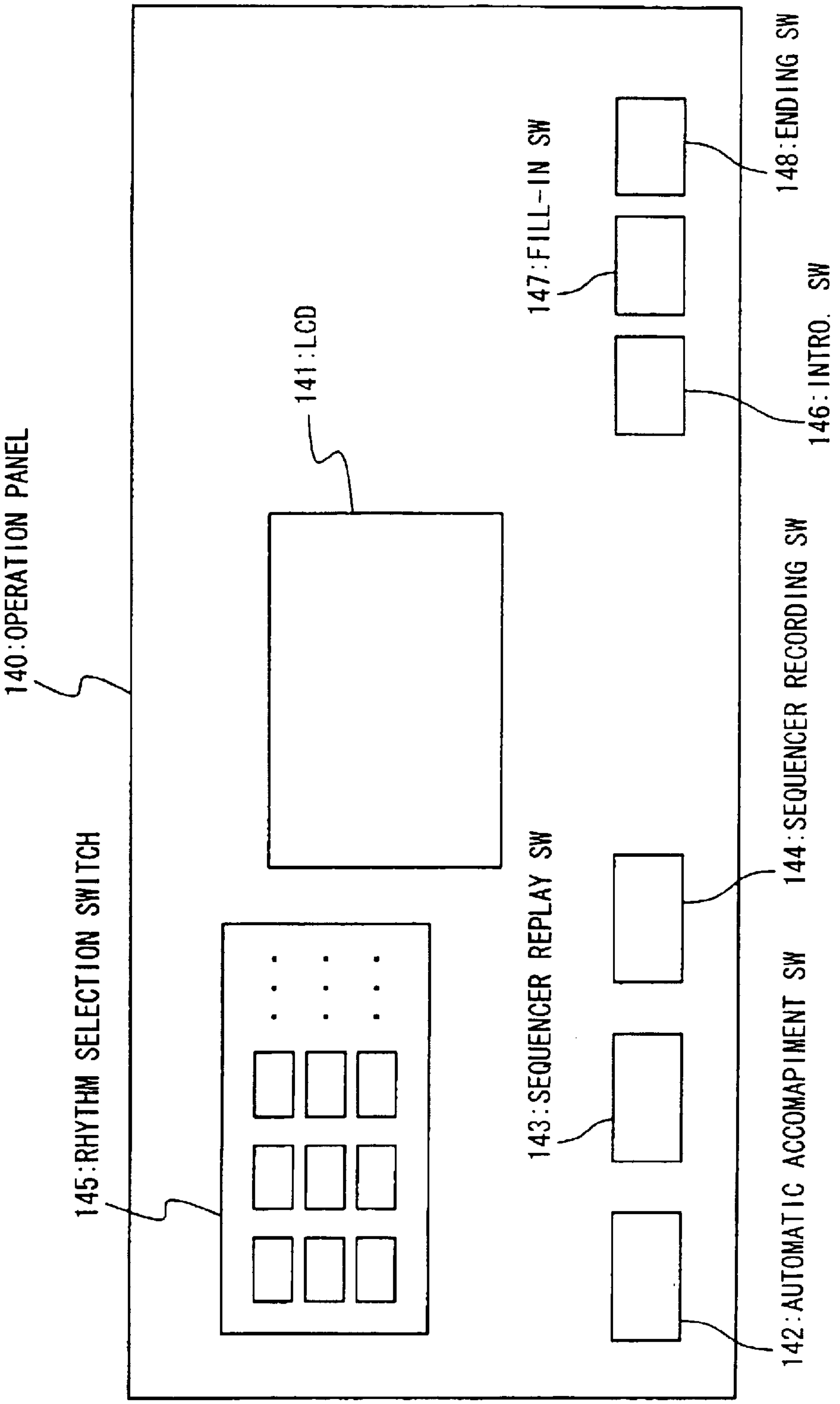
FIG. 5 is a diagram showing an example of an operation panel used in the automatic accompanying apparatus according to the first embodiment of the present invention.

An operation panel 140 is connected with the panel interface circuit 14. In the operation panel 140 are, as shown in FIG. 5, an LCD (Liquid Crystal Display) 141, an automatic accompaniment switch 142, a sequencer replay switch 143, a sequencer recording switch 144, a group of rhythm selector switches 145, an introduction switch 146, a fill-in switch 147, and an ending switch 148. It should be noted that only the ones necessary to describe the present invention are shown in FIG. 5. In addition to them, switches such as a mode setting switch, a tone selector switch, a volume switch, and an effect selector switch, and indicators to indicate the setting state of each switch are provided for the actual electronic musical instrument.

The LCD 141 displays a chord detected by the chord detecting process to be described later, in addition to various messages and the states of the electronic musical instrument. It should be noted that an LED display, a CRT display or a plasma display may be used to display letters, figures, and diagrams instead of the LCD 141.

The automatic accompaniment switch 142 is used to instruct the start and stop of the automatic accompaniment. The automatic accompaniment switch 142 has a function to toggle the start and stop of the automatic accompaniment alternately every time the automatic accompaniment switch 142 is pushed. The sequencer replay switch 143 is used to instruct the start and stop of the sequencer performance. The sequencer replay switch 143 has a function to toggle the start and stop of the sequencer performance alternately every time the sequencer replay switch 143 is pushed. The sequencer recording switch 144 is used to instruct the start and stop of a recording operation to sequencer 16, and has a function to toggle the start and stop of the recording to sequencer 16 alternately every time the sequencer recording switch 144 is pushed. The rhythm selector switch group 145 is composed of a plurality of switches, to each of which one rhythm is allocated. The rhythm selector switch 145 is used to select a rhythm in the automatic accompaniment. The introduction switch 146 is used to start introduction accompaniment. When the start of the automatic accompaniment is instructed by the automatic accompaniment switch 142 in the ON state of the introduction switch 146, the introduction automatic accompaniment is started. On the other hand, when the start of the automatic accompaniment is instructed by automatic accompaniment switch 142 in the OFF state of the introduction switch 146, the automatic accompaniment is started based on the basic pattern data. The fill-in switch 147 is used to start a fill-in automatic accompaniment based on fill-in pattern data. When the fill-in switch 147 is pushed in the state that the automatic accompaniment is carried out based on the introduction or basic pattern data, a fill-in automatic accompaniment is carried out for a few measures and then the automatic accompaniment returns to the original introduction or basic automatic accompaniment. The ending switch 148 is used to start the ending automatic accompaniment. When the ending switch 148 is pushed in the state that the introduction or basic automatic accompaniment is carried out, the ending automatic accompaniment is carried out for a few measures and then the automatic accompaniment is ended.

Each of the above-mentioned rhythm selector switch 145, the introduction switch 146, the fill-in switch 147 and the ending switch 148 has a function to toggle an ON state and an OFF state alternately every time it is pushed.

The panel interface circuit 14 controls the transmission and reception of data between the operation panel 140 and the CPU 10. That is, the panel interface circuit 14 generates panel data based on a signal from the operation panel 140 and sends to the CPU 10. The panel data is composed of a bit string in which each bit corresponds to one switch, shows the ON state of-the switch in case of "1" and shows the OFF state of the switch in case of "0". The CPU 10 carries out various processes corresponding to the operation of the operation panel 140 based on the panel data.

Also, the panel interface circuit 14 sends the display data received from the CPU 10 to the LCD 141. The control is carried out for the display of the data on the LCD 141 provided on the operation panel 140, and the lighting-up or lighting-off of the various indicators (not shown).

The keyboard interface circuit 15 is connected with a hand keyboard 150 and a leg keyboard 151. Each of the hand keyboard 150 and the leg keyboard 151 is provided with a plurality of keys to instruct the sound generation/extinguishment. For each of the keys in the hand keyboard 150 and the leg keyboard 151, a 2-contact type key is used which has a first switch and a second switch which are operated in different pushing depths in response to the key pushing operation or the key releasing operation.

The keys of the hand keyboard 150 are functionally classified into two groups based on a predetermined key (split point) by setting the electronic musical instrument to a split mode by a user. The two groups are a chord detection keyboard portion on a low-pitched tone side and a general performance keyboard portion on a high-pitched tone side. It should be noted that when the split mode is not set, all of the keys of the hand keyboard is used as the general performance keyboard portion. Also, it should be noted that it may be possible for the user to set the split point optionally.

The keyboard interface circuit 15 detects the key pushing operation state or the key releasing operation state and the strength of the key touch to each key of the hand keyboard 150 and the leg keyboard 151. That is, the keyboard interface circuit 15 generates key data showing the key pushing operation or the key releasing operation from the signal received from the hand keyboard 150 and the leg keyboard 151 and showing the ON/OFF state of the first and second key switches and touch data showing the strength of the key touch and sends to the CPU 10.

The key data is composed of a string of bits corresponding to the respective keys. Each bit is "1" to indicate the key pushing operation, when both of the two key switches provided for the key are turned on, and "0" to indicate the key releasing operation, otherwise. The above touch data is generated based on a time from when the first key switch is turned on to when the second key switch is turned on. The CPU 10 carries out the sound generation process, the sound extinguishment process and the chord detecting process in accordance with the key pushing operation or the key releasing operation based on the key data and the touch data sent from the keyboard interface circuit 15.

When the sequencer recording mode is set by the sequencer recording switch 144, the sequencer 16 records as sequence data, note data generated based on the key data and the touch data outputted from the general performance keyboard portion, musical sound control data generated based on a chord outputted from the chord detection keyboard portion and panel data from the operation panel 140, data for specifying a rhythm and a tone, in addition to data showing the sound generation time composed of a step time, a beat and a measure at that time. The sequence data recorded to the sequencer 16 is replayed in response to an instruction of the sequencer replay switch 143. It should be noted that the sequencer 16 may be connected with the MIDI circuit 100. In the case, the sequence data is recorded as the data of the MIDI form.

A digital-to-analog converter 170 is connected with the sound source 17. The sound source 17 is composed of a digital signal processor (DSP). The sound source 17 is provided with a plurality of sound generation channels and the sound source 17 generates musical sound signals in accordance with an instruction from the CPU 10. That is, when receiving data for specifying a sound generation channel and a tone parameter from the CPU 10, the sound source 17 sets a specified sound generation channel to an active state. The sound source 17 reads out the waveform data corresponding to the tone parameter from the musical sound waveform memory (not shown), and applies an envelope to the waveform data for the active sound generation channel. Thus, a digital musical sound signal is generated, and the digital musical sound signal is sent to the digital-to-analog converter 170.

The digital-to-analog converter 170 converts the received digital musical sound signal into an analog musical sound signal, and an output from the digital-to-analog converter 170 is sent to an amplifier 171. The amplifier 171 amplifies and sends the received musical sound signal to a speaker 172. The speaker 172 converts the amplified musical sound signal from the amplifier 171 into an acoustic signal and outputs it. Thus, a musical sound is generated from the speaker 172.

Next, the operation of the automatic accompanying apparatus according to the first embodiment of the present invention will be described.

First Embodiment

The automatic accompanying apparatus according to the first embodiment of the present invention carries out the re-trigger operation only in ON detection in which a chord is detected at the time of a key pushing operation, and does not-carry out the re-trigger operation in the OFF detection in which a chord is detected at the time of a key releasing operation.

Figure 6:
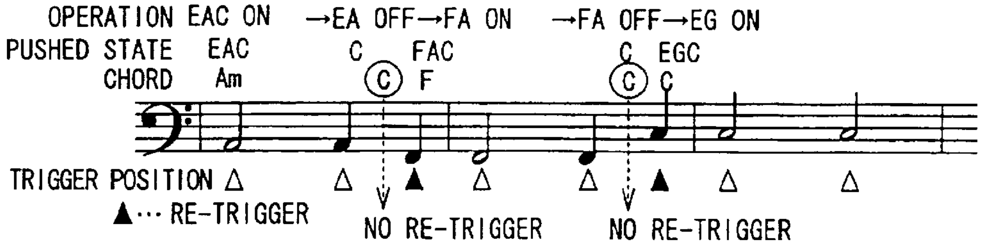
FIG. 6 is a diagram showing the operation of the automatic accompanying apparatus according to the first embodiment of the present invention.

FIG. 6 is a diagram showing the operation of the automatic accompanying apparatus according to the first embodiment. The ON detection is carried out to detect the chord Am when a player pushes the keys of "E", "A" and "C" at the leading point of the first measure. A trigger is carried out at the time of the first beat of the basic bass pattern and a bass sound is generated in the sound pitch of "A". When the key pushing operation state (state in which the keys of "E", "A" and "C" are pushed) continues, the trigger is carried out again at the time of the third beat of the basic bass pattern and the next bass sound is generated in the sound pitch of "A".

Next, the state changes into a state in which only the key of "C" is pushed when the player releases the keys of "E" and "A" at the time delayed from the third beat of the first measure by a little time. As a result, the chord C is detected at the time delayed from the third beat by a half of the beat. However, the sound generation based on the OFF detection is not carried out, and the re-trigger operation is not performed. The generation of the bass sound in the sound pitch of "C" based on the detected chord C is not carried out.

Next, when the player pushes the keys of "F" and "A" in the fourth beat, the keys of "F", "A" and "C" are in the key pushed state, and the chord F is detected through the ON detection. As a result, the re-trigger operation is carried out and at the time of the fourth beat, a bass sound with the sound pitch of "F" is generated.

Second Embodiment

The automatic accompanying apparatus according to the second embodiment of the present invention extinguishes the sounds not contained in the chord detected by the chord detecting process from the sounds of the chord part generated instead of carrying out the re-trigger operation, and sustains the remaining sounds as the sounds of the chord part.

Figure 7:
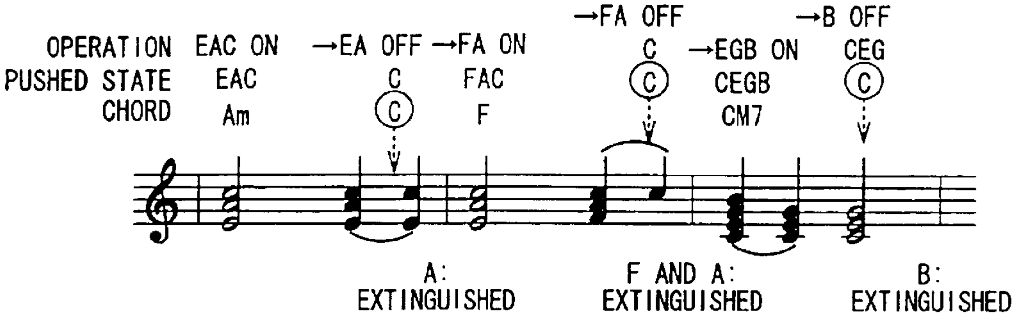
FIG. 7 is a diagram showing the operation of the automatic accompanying apparatus according to a second embodiment of the present invention.

FIG. 7 is a diagram showing the operation of the automatic accompanying apparatus according to the second embodiment. The ON detection is carried out and the chord Am is detected when the player pushes the keys of "E", "A" and "C" at the leading point of the first measure to specify the chord Am. Thus, the trigger is carried out at the time of the first beat of the basic chord pattern and the chord sound composed of the sounds of "E", "A" and "C" is generated. When the key pushing operation state (state in which the keys of "E", "A" nd "C" are pushed) continues, the trigger is carried out again at the time of the third beat of the basic chord pattern and the next chord sound composed of the sounds of "E", "A" and "C" is generated.

Next, when the player releases the keys of "E" and "A" at the time delayed from the third beat of the first measure by a little time, the key pushed state changes into the state that only the key of "C" is pushed and the chord C is detected. Because the sounds of the chord C here is "C", "E" and "G", the sound of "A" not contained in the chord C of the sounds of "E", "A" and "C" of the chord Am, is extinguished. Therefore, the sounds of "C" and "E" are sustained as the sounds of the chord part at the time of the fourth beat of the first measure.

Next, when the player pushes the keys of "F" and "A" in the first beat of the second measure, the key pushed state changes into the state in which the keys of "F", "A" and "C" are pushed, and the chord F is detected through the ON detection. As a result, the trigger is carried out at the time of the first beat of the second measure of the basic chord pattern and the sounds of "F", "A" and "C" of the chord F are generated as the sound of the chord part.

Embodiment 3

The automatic accompanying apparatus according to the third embodiment of the present invention extinguishes sounds other than a specific sound of the generated sounds of the bass part instead of carrying out the re-trigger operation, in the OFF detection in which chord detection is carried out at the time of the key releasing operation, and the bend is carried out temporarily such that the pitch of the specific sound is made same as that of the root sound (chord root) of the chord detected in the chord detecting process.

Figure 8:
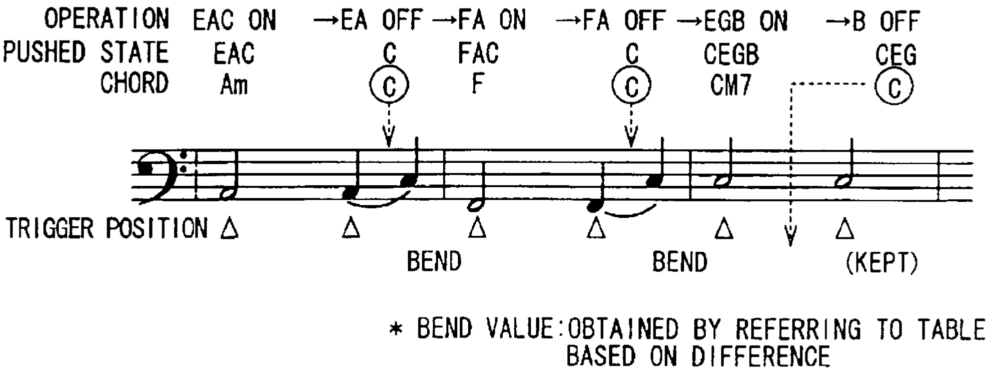
FIG. 8 is a diagram showing the operation of the automatic accompanying apparatus according to a third embodiment of the present invention.

FIG. 8 is a diagram showing the operation of the automatic accompanying apparatus according to the third embodiment. When the player pushes the keys of "E", "A" and "C" at the leading point of the first measure to specify the chord Am, the ON detection is carried out and the chord Am is detected. The trigger is carried out at the time of the first beat of the basic bass pattern and a bass sound is generated in the sound pitch of "A". When the key pushing operation state (the state in which the keys of "E", "A" and "C" are pushed) continues, the trigger is carried out again at the time of the third beat of the basic bass pattern and the next bass sound is generated in the sound pitch of "A".

Next, when the player releases the keys of "E" and "A" at the time of the fourth beat of the first measure, the key pushed state changes into the state that only the key of "C" is pushed and the chord C is detected. Here, the root sound of the chord C is "C", and the pitch bend is carried out such that the root sound changes from the root sound "A" of the chord Am into "C". Therefore, the bass sound is generated such that the pitch bend is carried out from "A" to "C" from third beat to fourth beat in the first measure.

Next, when the player pushes the key of "F" and "A" in the first beat of the second measure, the key pushed state changes into a state in which the keys of "F", "A" and "C" are pushed and the chord F is detected through the ON detection. As a result, the sound of "F" as the root sound of the chord F is generated as the bass sound.

Next, the operation of the automatic accompanying apparatus to realize the function according to the above-mentioned first to third embodiments will be described with reference to a flow chart.

(1) The Main Process

Figure 9:
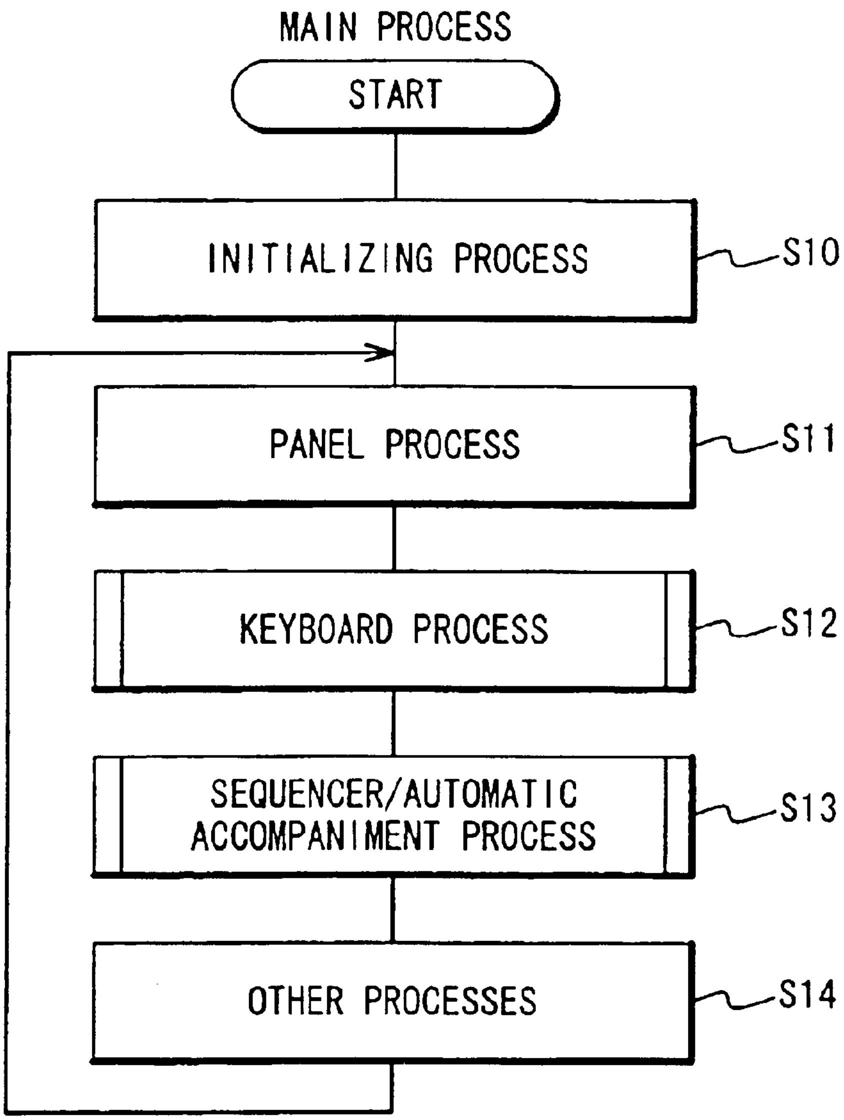
FIG. 9 is a flow chart showing a main process in the automatic accompanying apparatus according to the first to third embodiments of the present invention.

FIG. 9 is a flow chart showing the main process of the electronic musical instrument to which the automatic accompanying apparatus according to the first to third embodiments of the present invention is applied. The main process routine is started in response to a power on operation.

When the power is turned on, an initialization process is first carried out (Step S10). In the initialization process, the CPU 10 is reset and initial values are set to the buffers, the registers, the counters, and the flags which are defined in the work memory 12.

Next, when the initialization process ends, a panel process is carried out (Step S11). In the panel process, the operation panel 140 is first scanned. Specifically, the CPU 10 sends a scan instruction to the panel interface circuit 14. The panel interface circuit 14 receives the scan instruction and reads a signal showing the ON/OFF state of each switch on the operation panel 140 and sends to the CPU 10 as a panel data signal. The CPU 10 checks whether the bit corresponding to each switch in the received panel data signal has changed from "0" to "1" to determine whether an ON event in each switch occurs.

When it is determined that there is an on event of the switch, the flag provided in work memory 12 for the switch is inverted. More specifically, when there are the ON events of the automatic accompaniment switch 142, the sequencer replay switch 143, the sequencer recording switch 144, the rhythm selector switch 145, the introduction switch 146, the fill-in switch 147 and the ending switch 148, the automatic accompaniment flag, the sequencer replay flag, the sequencer recording flag, the rhythm selection flag, introduction flag, the fill-in flag and the ending flag are inverted, respectively. In this way, the ON state and the OFF state are alternately repeated every time the switch is pushed. Hereinafter, a process to the event of each switch is carried out with reference to the flag.

Next, a keyboard process is carried out (Step S12). In the keyboard process, the hand keyboard 150 and the leg keyboard 151 are scanned. A signal obtained through the scanning is sent to the CPU 10 as a key data and touch data signal through the keyboard interface circuit 15. The CPU 10 carries out a sound generation process, a sound extinguishment process and a chord detecting process based on the received key data signal.

Now, when the key data signal shows that the leg keyboard 151 is pushed, the bass detection request flag provided in work memory 12 is set. The details of the keyboard process will be described later.

Next, the sequencer/automatic accompaniment process is carried out (Step S13). In the sequencer/automatic accompaniment process, the replay of the sequence data recorded in the sequencer 16, the recording of the sequence data into the sequencer 16 and the generation of the automatic accompaniment sound based on the automatic accompaniment data and so on are carried out. The details of the sequencer/automatic accompaniment process will be described later.

Next, the other processes are carried out (Step S14). After that, the control flow returns to the step S11, and the same process is repeated hereinafter. When any of the operation panel 140, the hand keyboard 150 and the leg keyboard 151 is operated during the repetition of the above steps S11 to S14, the process corresponding to the operation is carried out and the functions of the electronic musical instrument and the automatic accompanying apparatus are realized.

(2) The Keyboard Process

Figure 10:
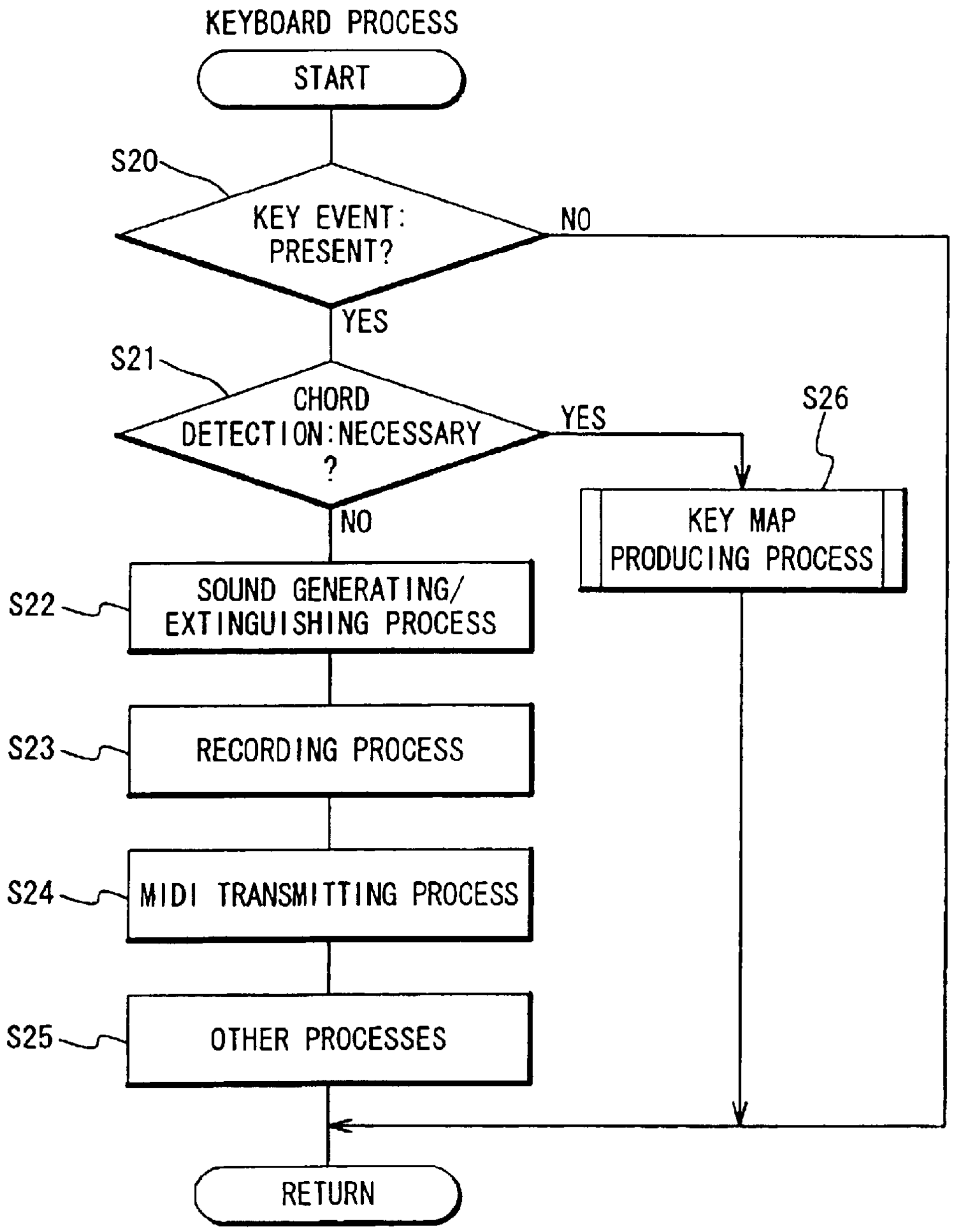
FIG. 10 is a flow chart showing the detail of a keyboard process carried out in the main process shown in FIG. 9.

Next, the detail of the keyboard process carried out in the step S12 of the main process will be described with reference to a flow chart shown in FIG. 10.

In the keyboard process, the existence or non-existence of a key event is first checked (Step S20). Specifically, the CPU 10 sends a scan instruction to the keyboard interface circuit 15. The keyboard interface circuit 15 receives the scan instruction and reads a signal showing the ON/OFF of the key switch provided for each of the keys of the hand keyboard 150 and leg keyboard 151. Then, The keyboard interface circuit 15 generates the key data signal based on the read signal and sends it to the CPU 10. The CPU 10 checks whether the event of each key has occurred by checking whether each bit in the received key data signal has changed. When the bit in the key data has changes from "0" into "1", it is recognized that the ON event has occurred. Also, when changing from "1" into "0", it is recognized that the OFF event has occurred.

Next, when it is determined that the key event has occurred in the above step S20, whether or not it is necessary to carry out the chord detection is checked (Step S21). Specifically, the electronic musical instrument is set to an automatic accompaniment mode (the automatic accompaniment flag is set to "1") and whether the ON event is the key event in the chord detection keyboard portion occurred is checked. When a determination is made that it is not necessary to carry out the chord detection, i.e., the mode is not set to the automatic accompaniment mode, or the mode is set to the automatic accompaniment mode but the key event is the key event of the general performance keyboard portion, the sound generation/sound extinguishment process is carried out (Step S22). In this case, the sound generation process is carried out when the key event is the ON event, and the sound extinguishment process is carried out in case of the OFF event.

In the sound generation process, a key number of the pushed key is generated based on the key data signal sent from keyboard interface circuit 15. One of the tone parameters in the program memory 11 is selected based on the generated key number and the touch data signal sent from keyboard interface circuit 15, and is sent to the sound source 17. As a result, the sound with the pitch specified based on the above key number is generated in the volume specified by the above touch data. In the sound extinguishment process, data to add an envelope attenuating at high speed to the waveform data read from the musical sound waveform memory (not shown) is sent to the sound source 17. Thus, the sound extinguishment is carried out in response to the key releasing operation.

Next, a recording process is carried out (Step S23). The recording process is carried out only when the sequencer recording switch 144 is pushed and an electronic musical instrument is set to the sequencer recording mode (the sequencer recording flag is set to "1"). In the recording process, the sequence data generated as described above is sent to the sequencer 16 and is recorded therein. Next, a MIDI transmission process is carried out (Step S24). In the MIDI transmission process, the above sequence data is converted into the data having MIDI format which is transmitted to an external unit through the MIDI circuit 100. Next, the other processes are carried out (Step S25). After that, the control flow returns to the main process routine.

Figure 11:
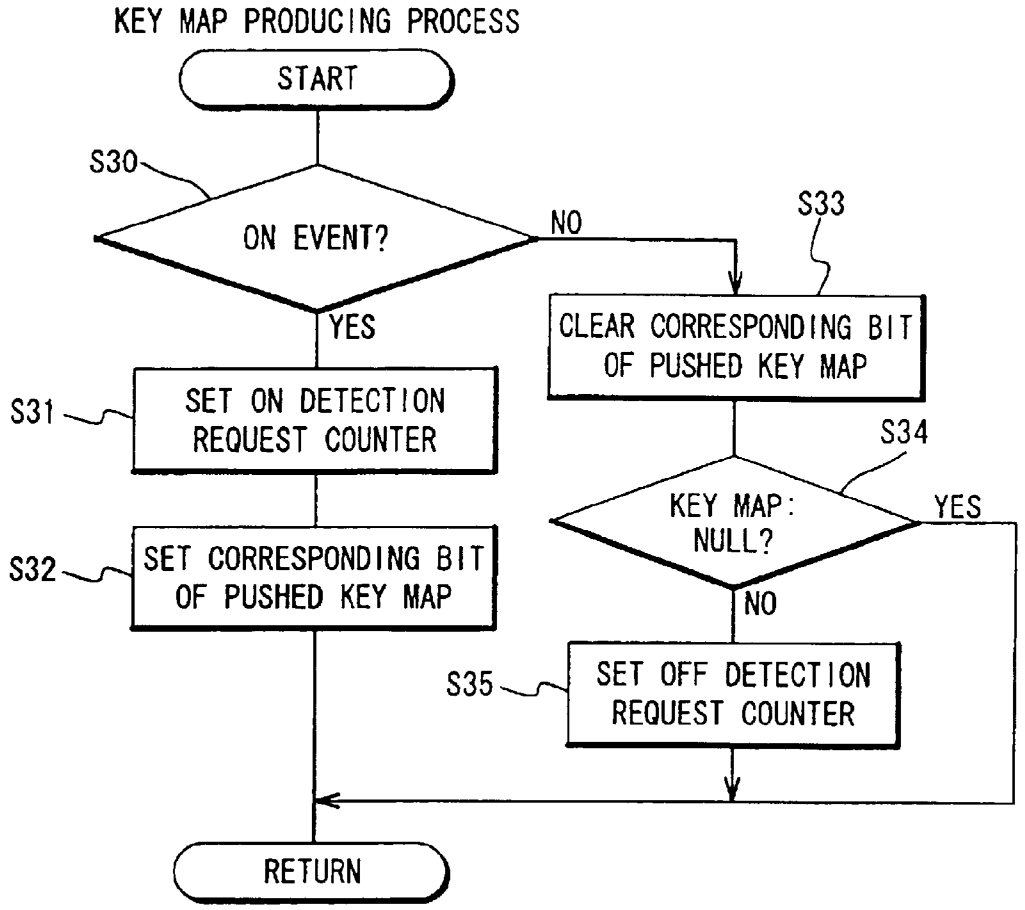
FIG. 11 is a flow chart -showing the detail of a key map producing process carried out in the keyboard process shown in FIG. 10.

When it is determined at the above step S21 that the chord detection is necessary, a key pushing operation map producing process is carried out (Step S26). The detail of the key pushing operation map producing process will be described with reference to a flow chart of FIG. 11.

In the key pushing operation map producing process, whether or not the key event is the ON event is first checked (Step S30). In this case, when it is determined to be the ON event, an ON count value is set to the ON detection request counter provided in the work memory 12 to determine that a predetermined time passed from the key pushing operation (Step S31). Next, the bit corresponding to the key of the ON event in the key pushing operation map occurred to is set in "1" (Step S32). In this case, the key pushing operation map is a buffer to collectively store ON/OFF state of the keys of the chord detection keyboard portion for one octave. The key data signal sent from the chord detection keyboard portion is divided for every octave and logical summation of corresponding key data in the plurality of octaves is calculated. Thus, the key pushing operation map is generated. After that, the control flow returns to the main process routine through the keyboard process.

When it is determined not to be the ON event at the above step S30, it is determined that the OFF event has occurred. The bit corresponding to the key of the OFF event in the key pushing operation map is cleared to "0" (Step S33). Next, whether the key pushing operation map is zero is checked (Step S34). That is, whether another pushed key exists even if there is the OFF event of the key is checked. In this case, when it is determined that the key pushing operation map is not zero, the OFF count value is set to the OFF detection request counter provided in the work memory 12 to determine that a predetermined time passed from the key releasing operation (Step S35). After that, the control flow returns to the main process through the keyboard process. When it is determined at the above step S34 that the key pushing operation map is zero, the control flow returns to the main process through the keyboard process.

(3) The Timer Process

Figure 12:
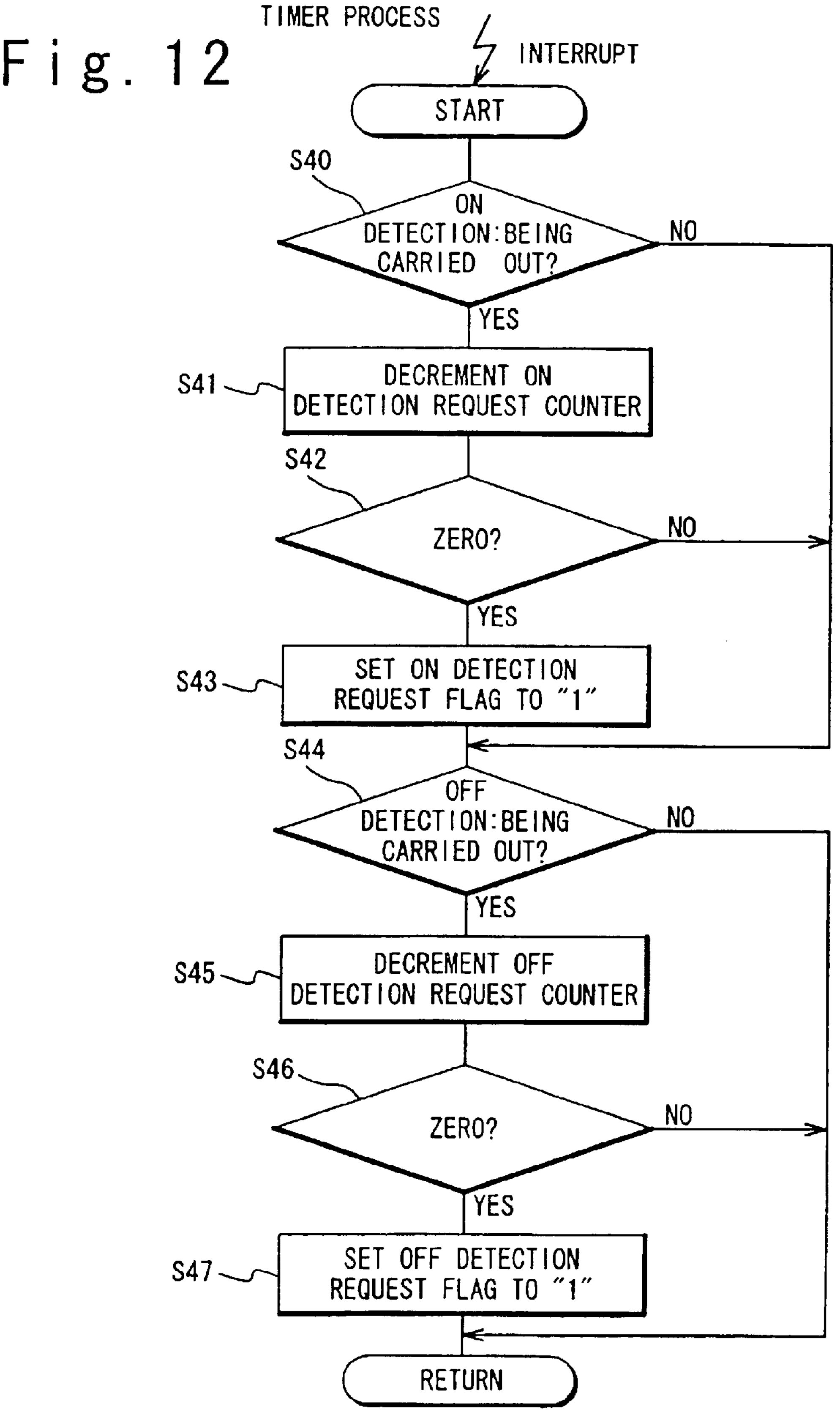
FIG. 12 is a flow chart showing a timer process in the automatic accompanying apparatus according to the first to third embodiments of the present invention.

Next, the timer process carried out at the same time as the main process will be described with reference to the flow chart shown in FIG. 12. The timer process is started in response to an interrupt signal generated from the timer 101 for every predetermined time interval.

In the timer process, whether the process is carrying out the ON detection is first checked (Step S40). Specifically, whether the ON detection request counter is undergoing a counting operation is checked. When it is determined to be carrying out the ON detection, the content of the ON detection request counter is decremented by one (Step S41). Next, whether the content of the ON detection counter became zero is checked (Step S42). In this case, when it is determined to have become zero, it is determined that a predetermined time passed from the key pushing operation. The ON detection request flag provided in the work memory 12 is set to "1" (Step S43). On the other hand, when it is determined not to be zero, the process of step S43 is skipped. The steps S41 to S43 of the process are skipped when it is determined not to be carrying out the ON detection at the above step S40.

Through the above process, the ON detection request is issued after the predetermined time passes from the key pushing operation. The above predetermined time is set such that it is enough time to converge the key operation chattering generated in the chord detection over two or more keys. Therefore, it can be prevented that the chord detection is carried out in the unstable state.

Next, whether the process is carrying out the OFF detection is checked (Step S44). Specifically, whether the OFF detection request counter is undergoing a count operation is checked. When it is determined to be carrying out the OFF detection, the content of the OFF detection request counter is decremented by one (Step S45). Next, whether the content of the OFF detection counter became zero is checked (Step S46). When it is determined to have become zero, it is determined that the predetermined time passed from the key pushing operation. The OFF detection request flag provided in the work memory 12 is set to "1" (Step S47). When it is determined not to be zero at the above step S46 and when it is determined not to be carrying out the OFF detection at the above step S44, the control flow returns to a position where the interrupt has occurred.

Through the above process, the OFF detection request is issued after the predetermined time passes from the key releasing operation. The above predetermined time is set such that it is enough time to converge the key operation chattering generated in the chord detection over two or more keys. Therefore, it can be prevented that the chord detection is carried out in the unstable state.

(4) The Sequencer/automatic Accompaniment Process

Figure 13A:
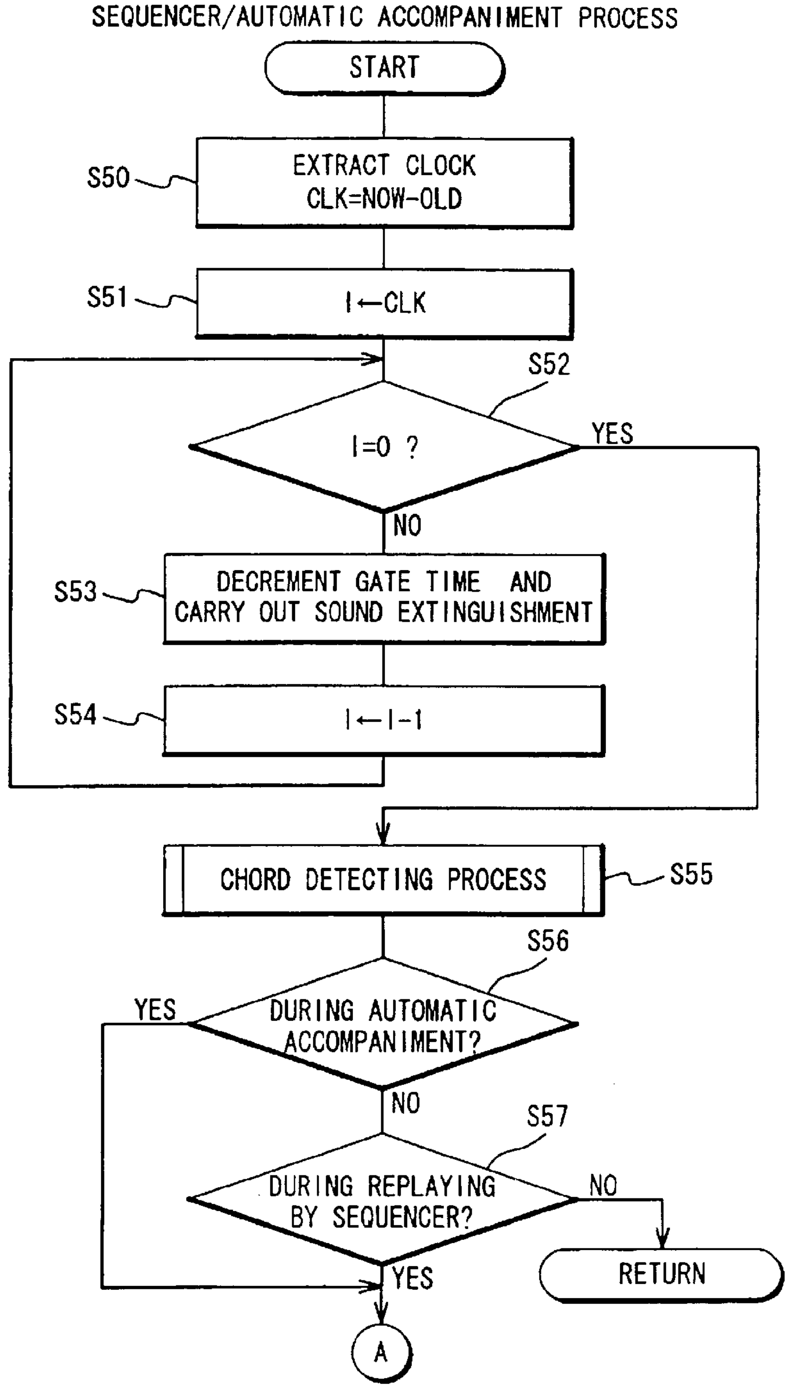
FIGS. 13A and 13B are flow charts showing the detail of the sequencer/automatic accompaniment process carried out in the main process shown in FIG. 9.
Figure 13B:
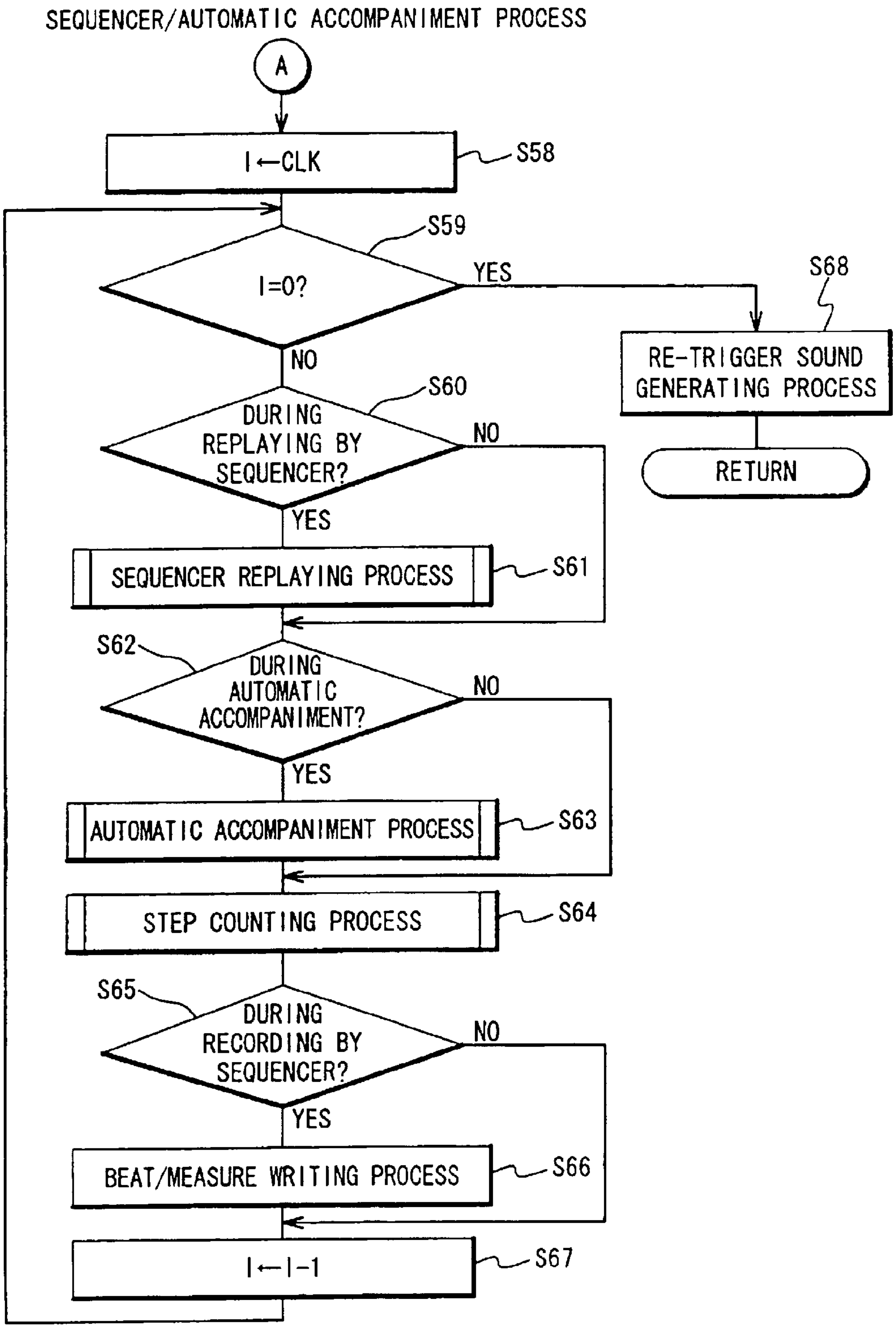

Next, the detail of the sequencer/automatic accompaniment process carried out at the step S13 of the main process will be described with reference to a flow chart shown in FIGS. 13A and 13B.

In the sequencer/automatic accompaniment process, an extraction process of a clock is first carried out (Step S50). The clock generated in the interval of the one step time from the timer for tempo clock (not shown) built in the CPU 10 is counted by the clock counter provided in the work memory 12. In the extraction process of the clock, a clock value CLK is calculated by subtracting the value OLD read out from the clock counter in the last sequencer/automatic accompaniment process from the value NOW read out from the clock counter in the present sequencer/automatic accompaniment process. The clock value CLK shows a time from when the last sequencer/automatic accompaniment process is carried out to when the current sequencer/automatic accompaniment process is carried out in the form of the step time value.

Next, the clock value CLK is set to the temporary register provided in the work memory 12 as a variable I (Step S51). Next, whether the variable I stored in the temporary register is zero is checked (Step S52). When it is determined that the variable I is not zero, a gate time value of the sound to be generated at present is decremented. The sound extinguishment process is carried out to extinguish the generated sound if the gate time value becomes zero as a result of the decrementing (Step S53). Next, the variable I stored in the temporary register is decremented by one (step S54) and after that, the control flow branches to the step S52.

The process of the above steps S52 to S54 is repeated until it is determined at the step S52 that the variable I became zero. Through the above repetitive process, even if one or more step times passes away until the current sequencer/automatic accompaniment process is carried out after the last sequencer/automatic accompaniment process is carried out, the generated sound is extinguished when the sound length specified by the gate time passes away. Next, when it is determined at the above step S52 that variable I is zero, the chord detecting process is carried out (Step S55). In the chord detecting process, a chord root, a chord type and a bass root are detected. The detail of the chord detecting process will be described later.

Next, whether the automatic accompanying apparatus is on automatic accompaniment is checked by checking whether the automatic accompaniment flag is set to "1" (Step S56). When it is determined not to be during automatic accompaniment, whether it is in the sequencer replay is determined by examining whether a sequencer replay flag is set to "1" (Step S57). When it is determined not to be in the sequencer replay, it is recognized that the state is not in the automatic accompaniment and the sequencer replay. The control flow returns to the main process routine.

When it is determined at the above step S56 that the state is during the automatic accompaniment or when it is determined at the above step S57 that the state is in the sequencer replay, the clock value CLK is set to the temporary register once again as the variable I (Step S58). Next, whether the variable I stored in the temporary register is zero is checked (Step S59). Next, when it is determined that the variable I is not zero, whether the state is in the sequencer replay is checked (Step S60). When it is determined to be in the sequencer replay, the sequencer replaying process is carried out (Step S61). In the sequencer replay process, when sequence data is read out from sequencer 16 and the sound generation time arrives, in other words, when the values of the separately counted step time, beat and measure are coincident with the step time value, beat value and measure value contained in the sequence data, the sound generation process is carried out based on the sequence data. When it is determined not to be in the sequencer replay at the above step S60, the process of the step S61 is skipped. Next, whether the state is during the automatic accompaniment is checked (Step S62). When it is determined to be during automatic accompaniment, an automatic accompaniment-process is carried out (Step S63). In the automatic accompaniment process, automatic accompaniment data is read out from the automatic accompaniment electron musical instrument memory 13 for each of the chord part, the bass part and the drum part. If the sound generation time of the read automatic accompaniment data arrives, in other words, when the step time in the note data contained in the automatic accompaniment data is coincident with the step time value STEP counted by the step time counter provided in the work memory 12, the sound generation process is carried out in accordance with the note data containing the step time. When it is determined not to be during automatic accompaniment at the above step S60, the process of step S63 is skipped.

Next, a step count process is carried out (Step S64). In the step count process, the step time value STEP counted by the step time counter is updated. The detail of the step count process will be described later.

Next, whether it is during sequencer recording is checked by checking whether the sequencer recording flag is set to "1" (Step S65). When it is determined to be during sequencer recording, the writing process of beat and measure is carried out (Step S66). When it is determined not to be during sequencer recording at the step S65, the process of the step S66 is skipped.

Next, the variable I stored in the temporary register is decremented by one (step S67) and after that, the control flow branches to the step S59. The process of the above steps S59 to S67 is repeated until it is determined at the step S59 that the variable I became zero. Through the repetitive process, even if one or more step times passes away until the current sequencer/automation accompaniment process is carried out after the last sequencer/automation accompaniment process is carried out, all the automatic accompaniment sounds and the sequencer replay sounds to be generated are generated and also all the data to be recorded is recorded in the sequencer 16. Moreover, the step time value STEP counted by the step time counter is updated to the latest value.

Next, when it is determined at the above step S59 that the variable I is zero, the re-trigger operation is carried out (Step S68). The re-trigger operation is carried out irrespective of the value of the clock counted by the clock counter, in other words, irrespective of the sound generation time defined in the automatic accompaniment data, when the re-trigger operation request is issued in the above-mentioned chord detecting process (step S55). Whether the re-trigger operation request is issued is determined based on whether the chord part re-trigger operation request flag and the bass part re-trigger operation request flag provided in the work memory 12 are set to "1". In the re-trigger operation, the sound generation is carried out in accordance with the note data which is generated based on the chord root, the chord type and the bass root detected in the chord detecting process, and which is stored in the re-trigger operation buffer provided in the work memory 12. The re-trigger operation function that an accompaniment sound is generated at the time when the key is pushed is realized, separately from the accompaniment sound generated at the time based on the automatic accompaniment data. After that, the control flow returns to the main process.

(4-1) The Step Count Process

Figure 14:
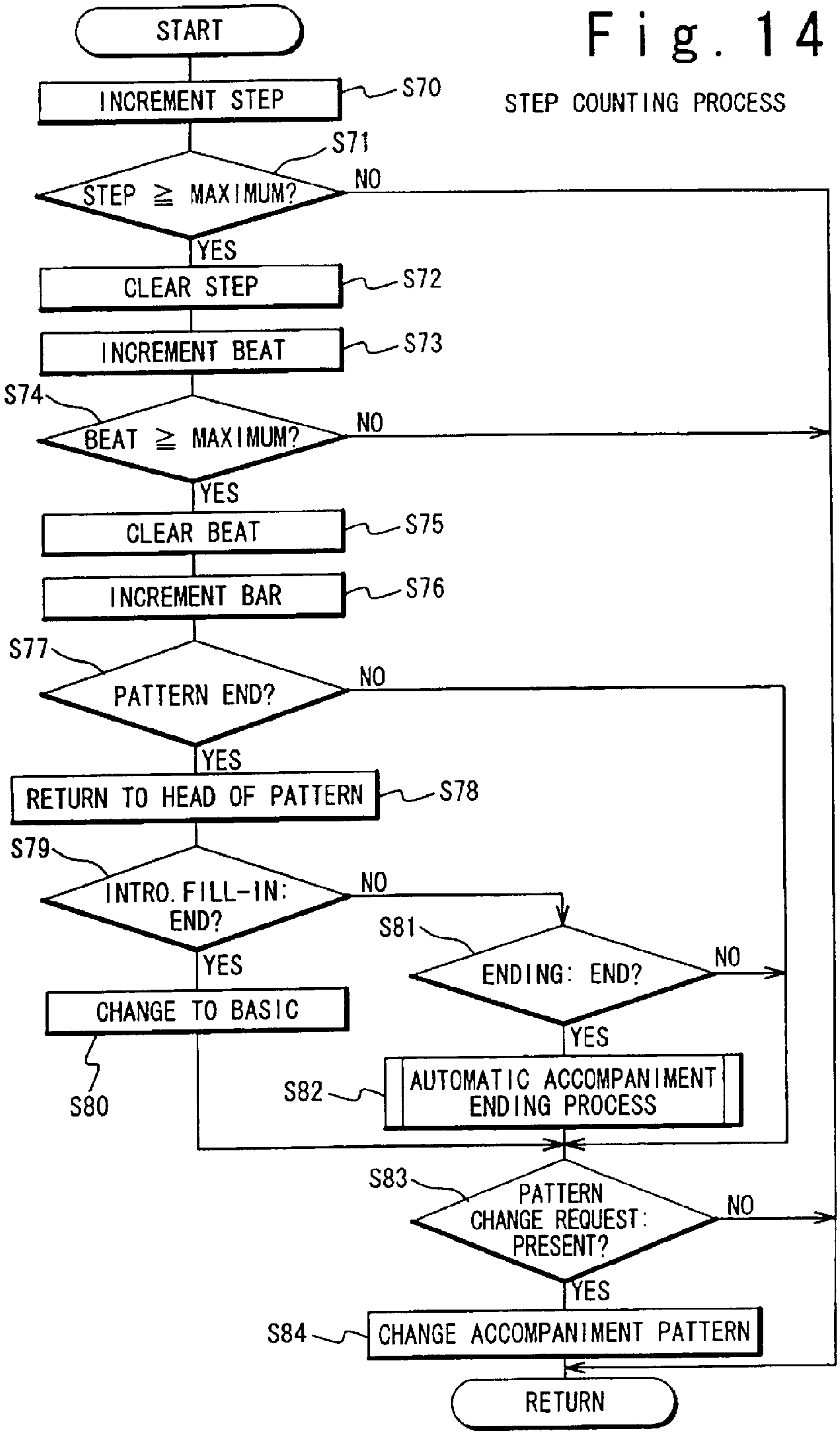
FIG. 14 is a flow chart showing the detail of a step counting process carried out in the sequencer/automatic accompaniment process shown in FIG. 13B.

Next, the detail of the step count process carried out in the step S64 of the sequencer/automatic accompaniment process will be described with reference to a flow chart shown in FIG. 14.

In the step count process, the step time value STEP is first stored in the step time counter and is incremented by one (Step S70). Next, whether the step time value STEP became more than the maximum value of the step time is checked (Step S71). In this case, when one beat is composed of 96 steps, the maximum value of the step time is 96. When it is determined at the step S71 that the step time value STEP is not larger than the maximum value of the step time, the control flow returns to the sequencer/automatic accompaniment process. On the other hand, when it is determined that the step time value STEP is larger than the maximum value of the step time, the content of the step time counter is cleared to zero (Step S72). Next, the beat value BEAT stored in the beat counter provided in the work memory 12 is incremented by one (Step S73).

Next, whether the beat value BEAT stored in the beat counter is larger than the maximum value of the beat value as the result of the increment of the beat value BEAT is checked (Step S74). In this case, the maximum value of beat value is equal to the tempo of the rhythm selected at that point and is "3" if 3 tempos, and "4" if 4 tempos.

When it is determined that the beat value BEAT is not larger than the maximum value of beat, the control flow returns to the sequencer/automatic accompaniment process. On the other hand, when it is determined that the beat value BEAT is larger than the maximum value of beat, the content of the beat counter is cleared to zero (Step S75). Next, the measure value BAR stored in the measure counter provided in the work memory 12 is incremented by one (Step S76).

Next, whether the pattern is a pattern end is checked (Step S76). This is carried out by checking whether an end mark exists in the automatic accompaniment data specified based on the step time value STEP, the beat value BEAT and the measure value BAR at that point. When it is determined to be the end pattern, the read position of the automatic accompaniment data is returned to the leading point of the automatic accompaniment pattern used at present (Step S78). Next, whether it is the end of the introduction/fill-in accompaniment pattern (INTRO/FIL) is checked (Step S79). When it is determined to be the end of the introduction/fill-in accompaniment pattern, the accompaniment pattern used for the automatic accompaniment is changed into the accompaniment pattern of basic (basic) (Step S80). After that, the control flow branches to step S83.

When it is determined not to be the end of the introduction/the fill-in accompaniment pattern at the above step S79, whether it is the end of the accompaniment pattern of ending (ENDING) is checked (Step S81). When it is determined to be the end of the accompaniment pattern of the ending, an automatic accompaniment ending process is carried out. (Step S82). In the process, the automatic accompaniment flag is cleared to "0". Thus, the execution of the automatic accompaniment process is skipped (step S63), and after that, the automatic accompaniment sound is not generated. On the other hand, when it is determined not to be the end of the accompaniment pattern of the ending, the control flow branches to the step S83. When it is determined not to be a pattern end at the above step S77, the control flow branches to the step S83.

At the step S83, whether there is a pattern change request is checked. Specifically, whether a fill-in flag and an ending flag are set to "1" is checked. When it is determined that there is the pattern change request, an accompaniment pattern change process is carried out (Step S84).

In the accompaniment pattern change process, when the fill-in flag is "1", it is changed such that the accompaniment pattern of the fill-in is used next. Also, when the ending flag is "1", it is changed such that the accompaniment pattern of the ending is used next. After that, the control flow returns to the sequencer/automatic accompaniment process. When it is determined at the above step S83 that there is no pattern change request, the control flow returns to the sequencer/automatic accompaniment process.

Through the above process, the content of the step time counter is incremented, and the contents of the beat counter and measure counter are updated based on the result. Also, a function is realized to change into the automatic accompaniment based on another accompaniment pattern when the automatic accompaniment based on one accompaniment pattern is ended.

(4-2) The Chord Detecting Process

Figure 15A:
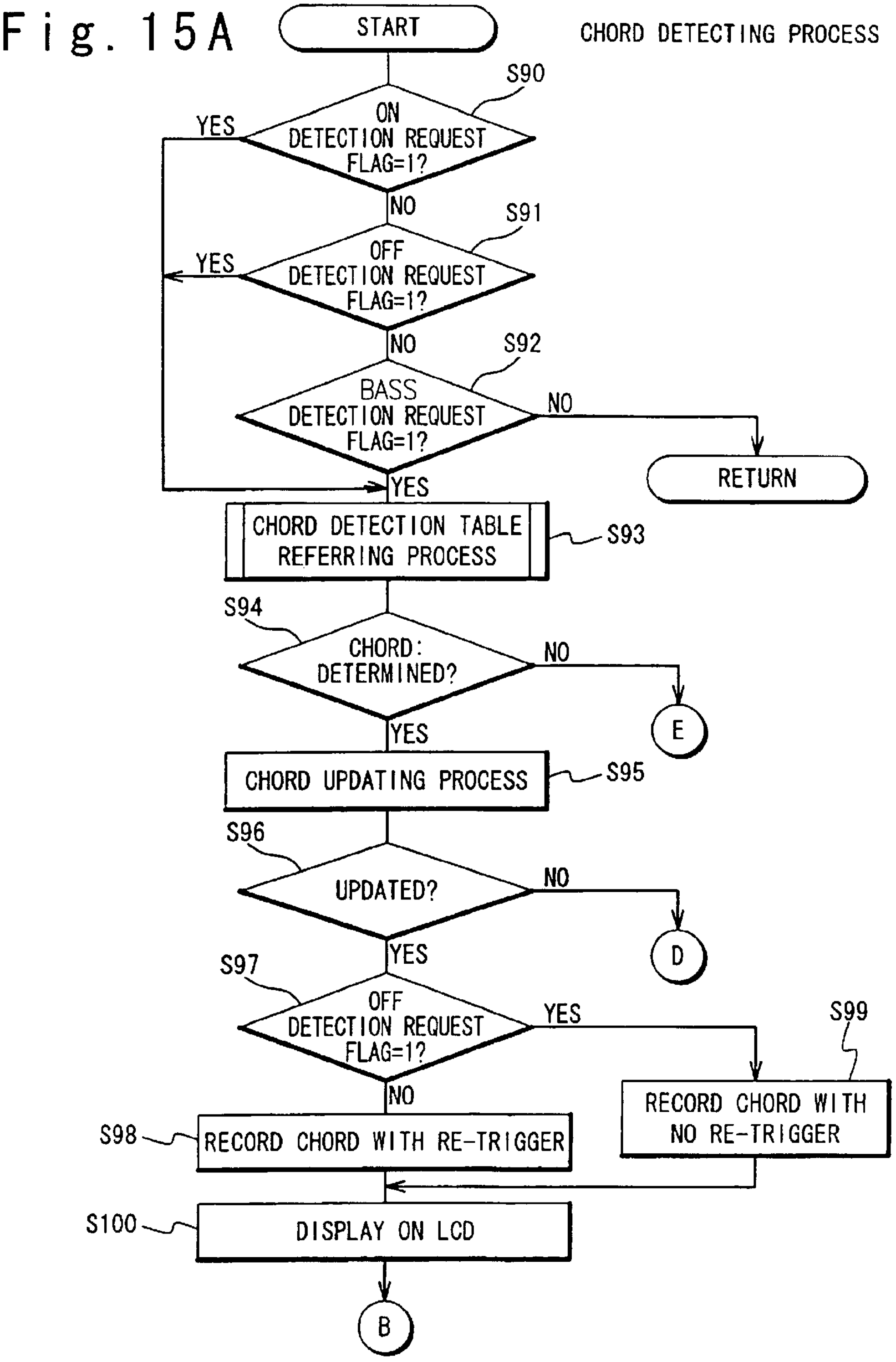
FIGS. 15A to 15C are a flow chart showing the detail of a chord detecting process carried out in the sequencer/automatic accompaniment process shown in FIG. 13A.
Figure 15B:
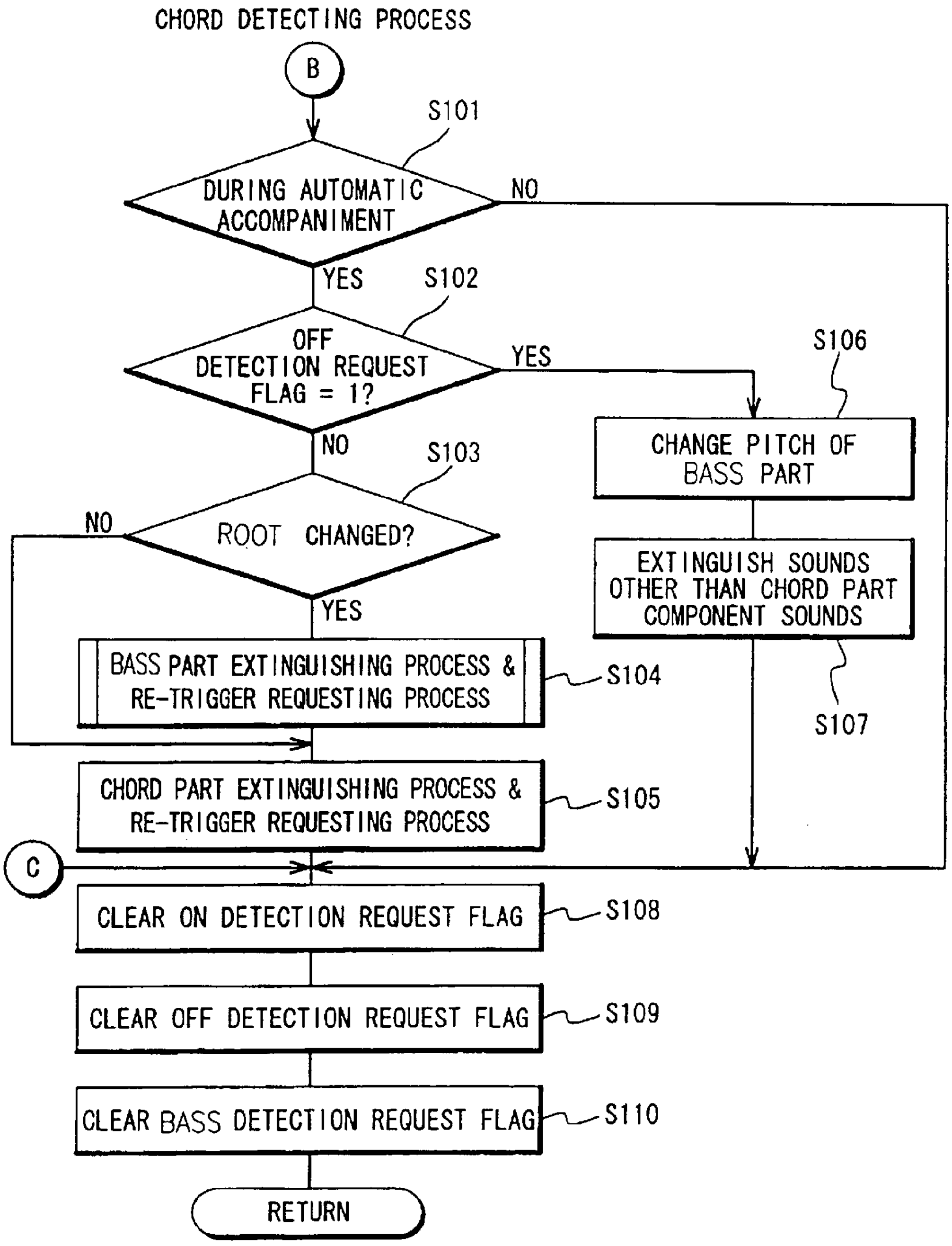
Figure 15C:
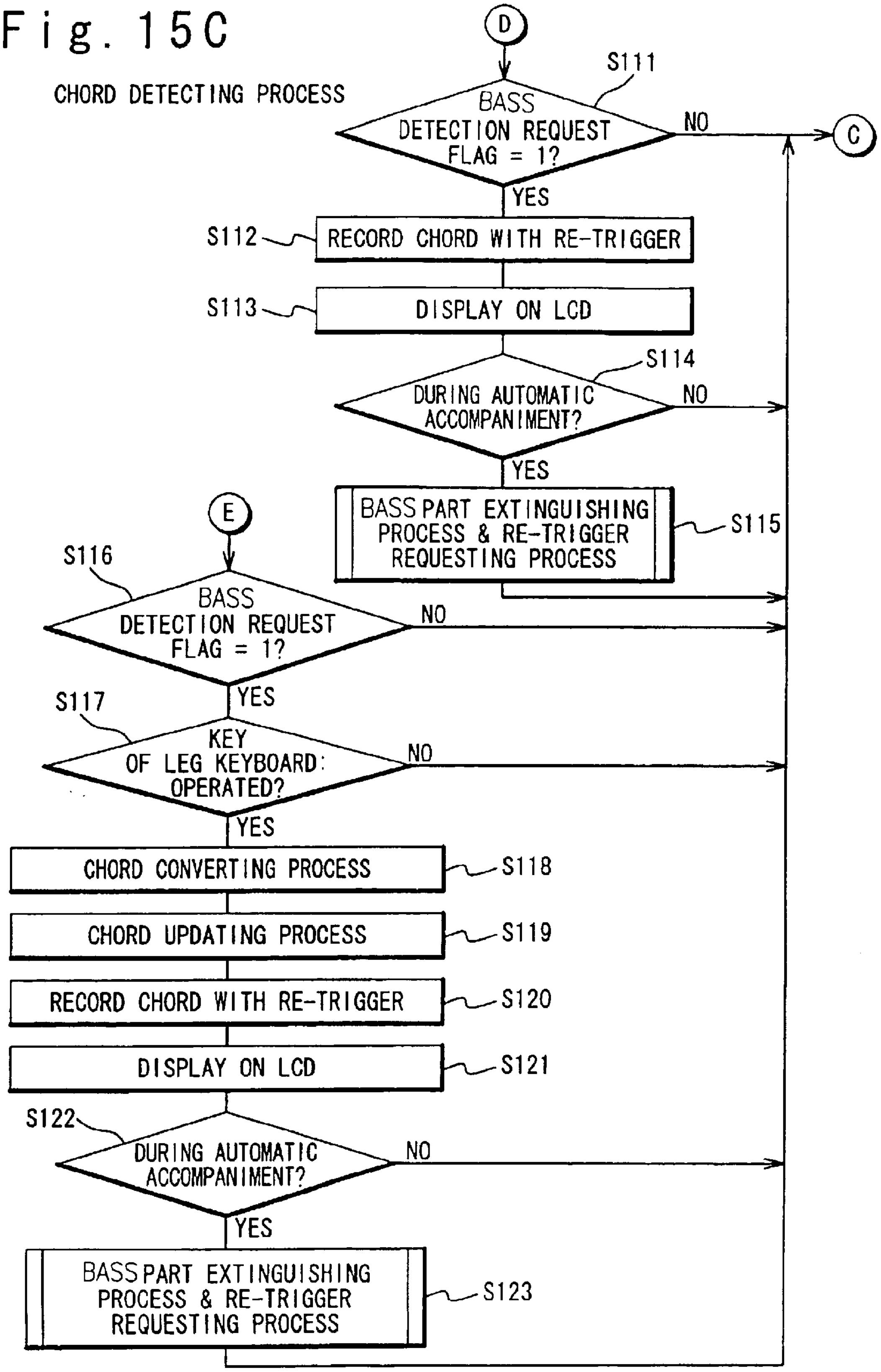

Next, the detail of the chord detecting process carried out in the step S55 of the sequencer/automatic accompaniment process will be described with reference to a flow chart shown in FIGS. 15A to 15C.

In the chord detecting process, whether the ON detection request flag is "1" is first checked (Step S90). When it is determined at the step S90 that the ON detection request flag is "0", whether the OFF detection request flag is "1" is checked (Step S91). Next, when it is determined at the step S91 that the OFF detection request flag is "0", whether the bass detection request flag is "1" is checked (Step S92). When it is determined at the step S92 that the bass detection request flag is "0", it is determined that all the ON detection request flag, the OFF detection request flag and the bass detection request flag are "0". The control flow returns to the sequencer/automatic accompaniment process routine.

Figure 16:
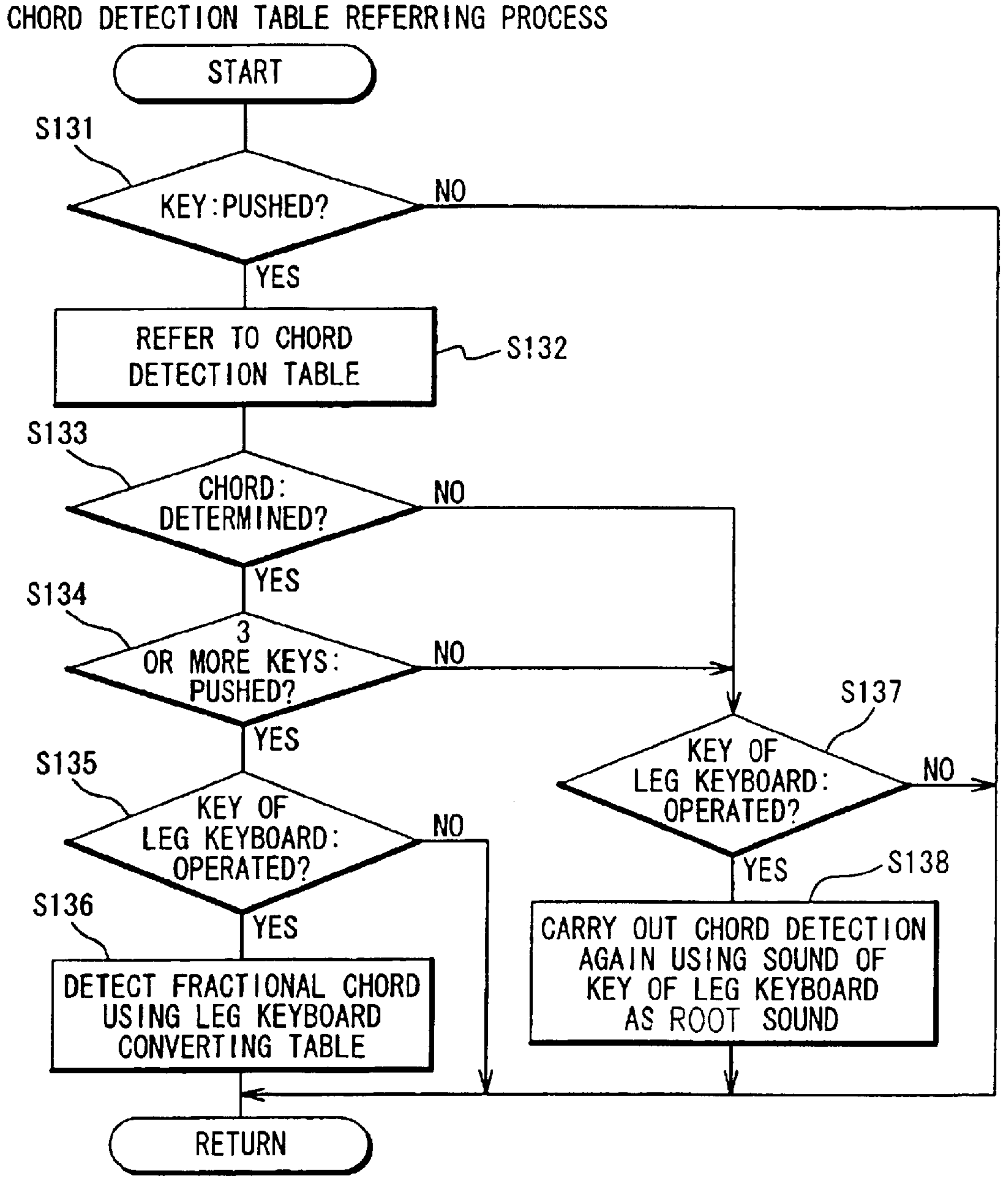
FIG. 16 is a flow chart showing the detail of a chord detection table referring process carried out in the chord detecting process shown in FIGS. 15A to 15C.

On the other hand, when it is determined at step S90 that the ON detection request flag is "1", when it is determined at the step S91 that the OFF detection request flag is "1", or when it is determined at the step S92 that the bass detection request flag is "1", the chord detection table referring process is carried out (Step S93). The detail of the chord detection table referring process is shown in a flow chart of FIG. 16.

In the chord detection table referring process, whether there is a key pushing operation by referring to the key pushing operation map produced at the above step S26 based on the chord detection keyboard portion of the hand keyboard 150 is first checked (Step S130). Then, when it is determined that there is no key pushing operation, the control flow returns to the chord detecting process routine.

On the other hand, when it is determined at the above step S131 that there is no key pushing operation, the chord detection table referring process provided in the work memory 12 is carried out (Step S132). In this case, the chord detection table is a table for storing the correspondence relation of the key pushing operation pattern and the chord in one octave. At the step S131, the content of the key pushing operation map and the content of the chord detection table are compared with each other in order to search the coincident one. When the coincident one is found out, a chord is determined, and a chord is not determined if there is no coincident one. When the chord is detected, in other words, when the chord is determined, the chord root, a chord type and a bass root of the chord are stored in the chord buffer provided in the work memory 12.

Next, whether the chord is determined is checked (Step S133). When it is determined that the chord is determined, whether three or more keys are pushed is checked (Step S134). Next, when it is determined that the three or more keys are pushed, whether there is a key pushing operation of the leg keyboard 151 is checked (Step S135).

When it is determined at the step S135 that there is the key pushing operation of the leg keyboard 151, the detection of the fractional chord is carried out by using a leg key conversion table provided in the work memory 12 (Step S136). The leg key conversion table is a table to convert the chord into a usual chord or a fractional chord when the sound of the leg keyboard is added to the component sounds of the chord. At the step S136, the usual chord or the fractional chord is determined based on the chord determined at the process of step S132 and the sound of the pushed key of the leg keyboard 151. After that, the control flow returns to the chord detecting process. When it is determined at the above step S135 that there is no key pushing operation of the leg keyboard 151, it is not necessary to detect the fractional chord. Consequently, the control flow returns to the chord detecting process.

When it is determined at the above step S134 that three or more keys are not pushed, whether there is a key pushing operation of the leg keyboard 151 is checked (Step S137). When it is determined that the leg keyboard 151 is pushed, a sound corresponding to the key of the leg keyboard 151 is used as a root sound and the chord detection is carried out once again (Step S138). The chord root and the chord type of the chord detected through the chord detection again are stored in the chord buffer. After that, the control flow returns to the chord detecting process. Even if one or two keys of the hand keyboard 150 are pushed, the chord detection using the key of the leg keyboard 151 is carried out, and the precision of the chord detection improves.

When it is determined at the above step S133 that a chord is not determined, whether or not there is a key pushing operation of the leg keyboard 151 is checked (Step S137). When it is determined that there is the key pushing operation of the leg keyboard 151, the key of the leg keyboard 151 is used as a root sound and the chord detection is carried out once again (Step S138). Thus, even if a chord is not determined based on the pushed keys of the hand keyboard 150, the chord can be determined by adding the key of the leg keyboard 151. Therefore, the precision of the chord detection improves.

Next, in the chord detecting process, whether a chord has been determined is checked (Step S94). This is carried out by checking whether a new chord is stored in the chord buffer. When it is determined that the chord has been determined, a chord updating process is carried out (Step S95). In the chord updating process, the chord stored in the chord register provided in the work memory 12 is replaced by the content of the chord buffer.

Next, whether the update is carried out, in other words, whether the chord is same before and after the chord update is checked (Step S96). When it is determined that the update has been carried out, whether the OFF detection request flag is "1" is checked (Step S97). When it is determined that the OFF detection request flag is "1" is determined, a key releasing operation is recognized to have been carried out. Because the re-trigger operation is not carried out in the OFF detection, the detected chord is recorded in the sequencer 16 as the sequence data together with the data showing no execution of the re-trigger operation (Step S99). After that, the control flow branches to step S100.

On the other hand, when it is determined at the above step S97 that the OFF detection request flag is not "1", a key pushing operation is recognized to have been carried out. Because the re-trigger operation is carried out in the ON detection, the detected chord is recorded in the sequencer 16 as the sequence data together with the data showing the execution of the re-trigger operation (Step S98). After that, the control flow advances to step S100.

At the step S100, the chord detected as mentioned above (the content of the chord register) is displayed on the LCD 141. Next, whether the state is on automatic accompaniment is checked (Step S101). Next, when it is determined to be on automatic accompaniment at the step S101, whether the OFF detection request flag is "1" is checked (Step S102). When it is determined at the step S102 that the OFF detection request flag is not "1", a key pushing operation is recognized to have been carried out and whether there is a change of the bass root is checked (Step S103). This is carried out by checking the content of the chord register. When it is determined at the step S103 that there is a change of the bass root, a sound extinguishment and re-trigger process of the bass part is carried out (Step S104).

Figure 17:
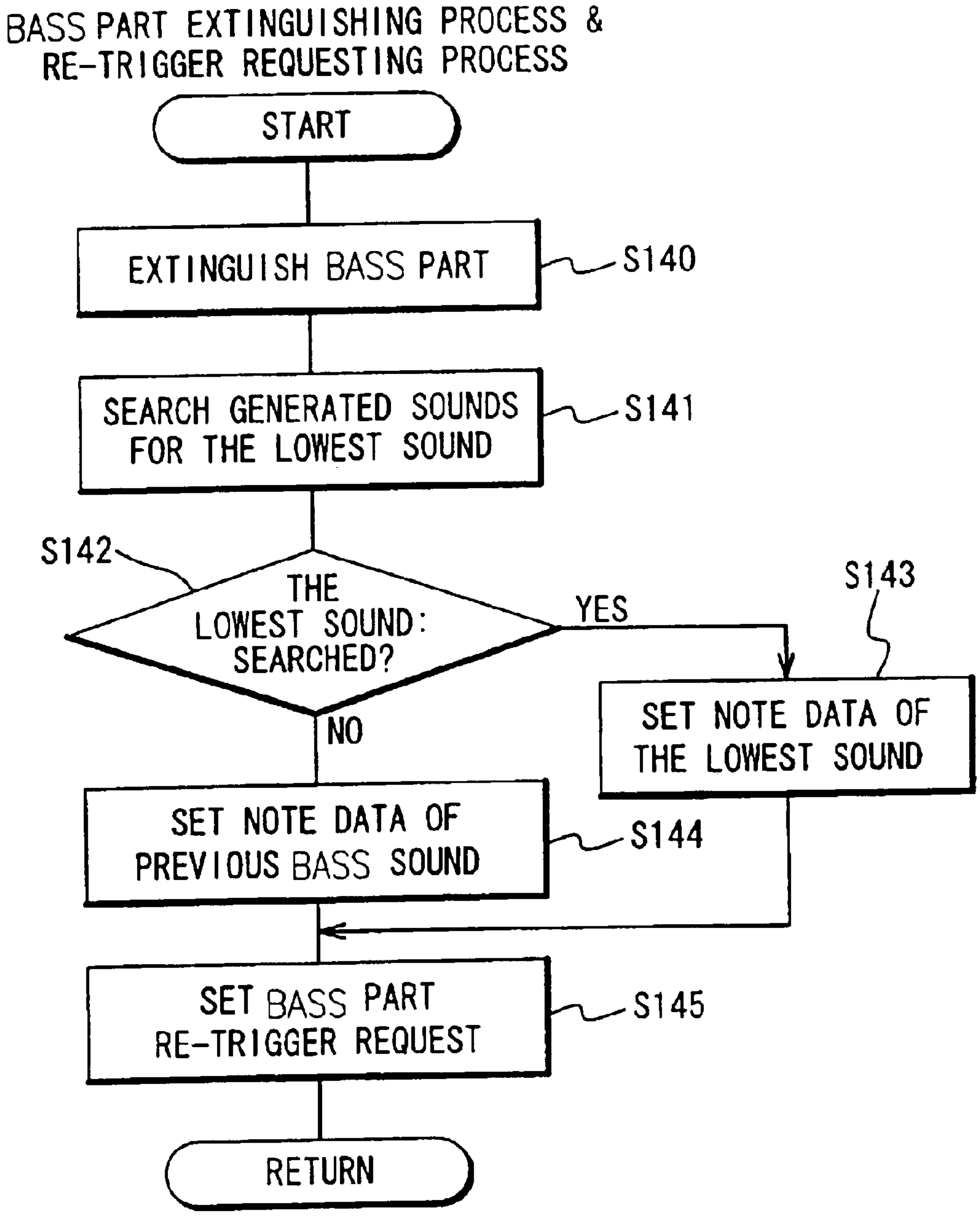
FIG. 17 is a flow chart showing the detail of bass part extinguishing and re-trigger operation requesting process shown in FIGS. 15A to 15C.

In the sound extinguishment and re-trigger process of the bass part, the sound extinguishment of the bass part is first carried out as shown in FIG. 17 (Step S140). Next, the lowest sound of the generated sounds is searched (Step 141). More specifically, the lowest sound of the generated sounds is searched from assigner which allocates the sounds of the automatic accompaniment to sound sources 17. Whether the lowest sound exists is checked (Step S142). In this case, at the time of the rest, the lowest sound does not exist. When it is determined at the step S142 that the lowest sound exists, the note data corresponding to the lowest generated sound is set to the re-trigger operation buffer (Step S143). The Gate time, the velocity and a note number are contained in the note data as mentioned above. After that, the control flow branches to step S145.

On the other hand, when it is determined that the lowest sound does not exist, the note data corresponding to the bass sound generated the last time is set to the re-trigger operation buffer (Step S144). Then, the control flow advances to step S145. At the step S145, a bass part re-trigger operation request flag is set to "1". After that, the control flow returns to the chord detection. In this way, a bass sound is generated at the step S68 of the sequencer/automatic accompaniment process carried out later.

Through the above process, the key of the leg keyboard 151 which is pushed the last is detected as the bass root. At this time, if there is a generated sound in the bass part, the re-trigger operation is carried out using the root sound. If there is not a generated sound, sounds of the bass part are generated in accordance with the gate time, velocity contained in the note data which defines sounds of the bass part generated last and the note number of the root sound.

When it is determined at the above step S103 that there is not a change of the bass root, the process of step S104 is skipped. Next, the sounds of the chord part are extinguished and the re-trigger operation request process is carried out (Step S105). The chord part re-trigger operation request-flag is set to "1". In this way, the component sounds of the detected chord are generated at the step S68 of the sequencer/the automatic accompaniment process carried out later. After that, the control flow advances to a step S108. Through the process of the above steps S103 to S105, when the root sound of the chord detected by the chord detecting section in response to the pushing operation of the key of the leg keyboard 151 is not changed, the re-trigger operation of the bass part is not carried out and only the re-trigger operation of the chord part is carried out. In this way, the trigger by the operation of the hand keyboard 150 can be reflected to the chord part and the trigger by the operation of the leg keyboard 151 can be reflected to the bass part. Therefore, in a fractional chord performance, the response of the automatic accompaniment through the chord detection can be brought closer to the intention of the player.

When it is determined at the above step S102 that the OFF detection request flag is "1", a key releasing operation is recognized to have been carried out and the pitch change of the bass part is carried out (Step S106). That is, sounds of the generated sounds of a bass part other than the lowest sound as a specific sound are extinguished. A bend is carried out temporarily such that the pitch of the specific sound becomes same as that of the root sound (chord root) of the detected chord. The pitch change is carried out by referring to the bass bend value table provided in the work memory 12 and shown in FIG. 18. Specifically, the root sound of the detected chord is set as a new bass root sound and a difference in pitch between the new bass root sound and the bass root sound generated until now is calculated in units of semitones. The bend value (stored in units of semitones) corresponding to the calculated difference is read out from the bass bend value table and is sent to the sound source 17. Thus, using the well-known technique, the pitch is changed from the previous sound pitch into the sound pitch of the new bass root. In this way, the function of the above-mentioned third embodiment can be realized. In this case, because the bass sound which has an attack is never generated unlike the re-trigger operation sound generation, the unnaturalness can be avoided.

Next, the process of extinguishing sounds other than the component sounds of the detected chord is carried out (Step S107). Specifically, sounds not contained in the detected chord of the generated sounds of the chord part are extinguished and the remaining sounds is sustained as the sound of the chord part. In this way, the function of the above-mentioned second embodiment is realized. In this case, because the chord sound which has an attack is never generated unlike the re-trigger operation sound generation, the shift in the interval can be carried out smoothly, and the unnaturalness can be avoided. After that, the control flow branches to step S108.

At the steps S108, S109 and S110, the ON detection flag, the OFF detection flag and the bass detection request flag are cleared, respectively. After that, the control flow returns to the sequencer/automatic accompaniment process.

When it is determined at the above step S96 that the update is not carried out, whether the bass detection request flag is "1" is checked (Step S111). When it is determined that the bass detection request flag is "1", the leg keyboard 151 is recognized to have been pushed. Because the re-trigger operation is carried out in the ON detection, the detected chord is recorded in the sequencer 16 as the sequence data together with the data showing execution of the re-trigger operation (Step S112). Next, the chord detected as mentioned above is displayed on the LCD 141 (Step S113).

Next, whether it is during automatic accompaniment is checked (Step S114). When it is determined to be during automatic accompaniment, the bass part sound extinguishment process and re-trigger operation request process are carried out (Step S115). The process of the step S115 is same as the process of the above-mentioned step S104. After that, the control flow branches to the step S108. When it is determined not to be during automatic accompaniment at the above step S114, the control flow also branches to the step S108. Through the process of the above steps S111 to S115, even if the chord detected in response to the pushing operation of the hand keyboard 150 is not changed from the previous chord, the re-trigger operation of the bass part is carried out, when the key of the leg keyboard 151 is pushed.

When it is determined at the above step S94 that a chord is not determined, whether the bass detection request flag is "1" is checked (Step S116). When it is determined that the bass detection request flag is "1", whether the leg keyboard 151 is pushed is checked (Step S117). When it is determined at the step S117 that the leg keyboard 151 is pushed, the chord conversion process is carried out based on the bass root (Step S118). In the chord conversion process, the process for converting a fractional chord into usual chords, which are not fractional chords, is carried out. That is, when the fractional chord is Am7/C, the fractional chord Am7/C is converted into the usual chord C6.

Next, the chord updating process is carried out (Step S119). That is, the present chord stored in the chord register is replaced by the chord obtained at the above step S118. Next, because the re-trigger operation is carried out in the ON detection, the detected chord is recorded in the sequencer 16 as the sequence data together with the data showing the execution of the re-trigger operation (Step S120). Next, the updated chord is displayed on the LCD 141 (Step S121).

Next, whether it is during automatic accompaniment is checked (Step S122). When it is determined to be during automatic accompaniment, the bass part sound extinguishing process and the re-trigger operation requesting process are carried out (Step S123). The processes of the step S123 are same as those at the above-mentioned step S104. After that, the control flow branches to the step S108. When it is determined not to be during automatic accompaniment at the above step S122, when it is determined at step S117 that the leg keyboard 151 is pushed, or when it is determined at the above step S116 that the bass detection request flag is "1", the control flow branches to the step S108. Through the processes of the above steps S116 to S123, even if a chord is not determined in response to the key pushing operation of the hand keyboard 150, the re-trigger operation of the bass part is carried out when the key of the leg keyboard 151 is pushed and the chord is detected through the chord conversion using the sound corresponding to the key as the bass root.

As described above, according to the automatic accompanying apparatus of the electronic musical instrument according to the embodiments of the present invention, the chord detection is carried out at both at a time when the key of the keyboard is pushed and a time when the key of the keyboard is released. However, the re-trigger operation is carried out only when the key is pushed and the re-trigger operation is not carried out when the key is released. Therefore, the generation of the accompaniment sound by the re-trigger operation not intended by the player is restrained, and it is possible to generate the accompaniment sound coincident with the intention of the player.

It should be noted that the embodiments may be modified as follows. That is, whether the chord detection by the chord detecting section carried out last time is the ON detection carried out when the key of the keyboard is pushed or the OFF detection carried out when the key of the keyboard is released is stored in the buffer. The CPU 10 carries out the re-trigger operation even if the chord detected by the chord detecting section is not changed from the chord detected by the chord detecting section in the last time if the buffer stores that the OFF detection is carried out when ON detection by the chord detecting section is carried out.

As described above in detail, according to the present invention, the automatic accompanying apparatus of the electronic musical instrument can be provided in which it is possible to generate the accompaniment sound coincident with the intention of the player.

What is claimed is:

1. An electronic musical instrument comprising:

a hand keyboard;

a key operation detecting section which detects a hand key operation on said hand keyboard, said hand key operation containing a hand key pushing operation and a hand key releasing operation;

a storage section which stores automatic accompaniment data;

a sound generating section; and a control unit which detects a chord of a chord part in response to said hand key pushing operation and said hand key releasing operation, and generates chord control data for a re-trigger operation based on the detected chord of said chord part, when said hand key operation is said hand key pushing operation, wherein said sound generating section generates a new accompaniment sound based on said chord control data and said automatic accompaniment data in said re-trigger operation.

2. The electronic musical instrument according to claim 1, wherein said control unit generates said chord control data based on the detected chord of said chord part, such that said sound generating section generates said new accompaniment sound based on said chord control data and said automatic accompaniment data in said re-trigger operation, after a currently generated accompaniment sound is extinguished, when said hand key operation is said hand key pushing operation.

3. The electronic musical instrument according to claim 1, further comprising:

a leg keyboard, and said key operation detecting section detects a leg key operation on said leg keyboard, said leg key operation containing a leg key pushing operation and a leg key releasing operation, and said control unit detects a chord of a bass part in response to said leg key pushing operation and said leg key releasing operation, and generates said chord control data for said re-trigger operation based on the detected chord of said bass part, when said leg key operation is said leg key pushing operation, wherein said sound generating section can generate said new accompaniment sound based on said detected chord of said bass part and said automatic accompaniment data in said re-trigger operation.

4. The electronic musical instrument according to claim 3, wherein said control unit generates said chord control data based on the detected chord of said bass part, such that said sound generating section generates said new accompaniment sound based on said chord control data and said automatic accompaniment data in said re-trigger operation, after a currently generated accompaniment sound is extinguished, when said leg key operation is said leg key pushing operation.

5. The electronic musical instrument according to claim 1, wherein said control unit generates said chord control data such that ones of component sounds of a currently generated accompaniment sound other than component sounds of the detected chord of said chord part are extinguished in response to the detection of said chord, and such that remaining component sounds are sustained, when said hand key operation is said hand key releasing operation.

6. The electronic musical instrument according to claim 3, wherein said control unit generates said chord control data such that ones of component sounds of a currently generated accompaniment sound other than a specific component sound are extinguished in response to the detection of said chord of said bass part, and such that a bend operation is carried out to set a pitch of said specific sound to that of a root sound of the detected chord, when said leg key operation is said leg key releasing operation.

7. The electronic musical instrument according to claim 6, wherein said specific component sound is the lowest one of the component sounds of said bass part of the currently generated accompaniment sound.

8. The electronic musical instrument according to claim 3, wherein said control unit generates said chord control data such that said re-trigger operation is carried out based on the detected chord of said chord part without said re-trigger operation based on the detected chord of said bass part, when a root sound of the chord detected in response to said leg key pushing operation is not changed from the root sound of a chord of a currently generated accompaniment sound.

9. The electronic musical instrument according to claim 3, wherein said control unit detects a last pushed leg key and sets a bass root sound corresponding to the last pushed leg key, and generates said chord control data such that said re-trigger operation is carried out based on said bass root sound when an accompaniment sound is currently generated, and such that said re-trigger operation is carried out based on a gate time and velocity contained in a last generated accompaniment sound and said bass root sound.

10. The electronic musical instrument according to claim 1, further comprising:

a sequencer, and said control unit registers said chord control data in said sequencer.

11. An electronic musical instrument comprising:

a hand keyboard;

a key operation detecting section which detects a hand key operation on said hand keyboard, said hand key operation containing a hand key pushing operation and a hand key releasing operation;

a storage section which stores automatic accompaniment data;

a sound generating section; and a control unit which detects a chord of a chord part in response to said hand key pushing operation and said hand key releasing operation, and generates a chord control data such that ones of component sounds of a currently generated accompaniment sound other than component sounds of the detected chord of said chord part are extinguished in response to the detection of said chord, and such that remaining component sounds are sustained, when said hand key operation is said hand key releasing operation.

12. An electronic musical instrument, comprising:

a leg keyboard, and a key operation detecting section detects a leg key operation on said leg keyboard, said leg key operation containing a leg key pushing operation and a leg key releasing operation, and a storage section which stores automatic accompaniment data;

a sound generating section; and a control unit which detects a chord of a bass part in response to said leg key pushing operation and said leg key releasing operation, and generates chord control data for a re-trigger operation based on the detected chord of said bass part, when said leg key operation is said leg key pushing operation, wherein said sound generating section can generate a new accompaniment sound based on said detected chord of said bass part and said automatic accompaniment data in said re-trigger operation.

13. The electronic musical instrument according to claim 12, wherein said control unit generates said chord control data such that ones of component sounds of a currently generated accompaniment sound other than a specific component sound are extinguished in response to the detection of said chord of said bass part, and such that a bend operation is carried out to set a pitch of said specific sound to that of a root sound of the detected chord, when said leg key operation is said leg key releasing operation.

14. The electronic musical instrument according to claim 13, wherein said specific component sound is the lowest one of the component sounds of said bass part of the currently generated accompaniment sound.

15. The electronic musical instrument according to claim 12, wherein said control unit detects a last pushed leg key and sets a bass root sound corresponding to the last pushed leg key, and generates said chord control data such that said re-trigger operation is carried out based on said bass root sound when an accompaniment sound is currently generated, and such that said re-trigger operation is carried out based on a gate time and velocity contained in a last generated accompaniment sound and said bass root sound.

16. A method of carrying out a re-trigger operation, in an electronic musical instrument, comprising the steps of:

(a) detecting a chord in response to a key operation on a keyboard section, said key operation containing a key pushing operation and a key releasing operation;

(b) extinguishing a currently generated accompaniment sound when said key operation is said key pushing operation to said keyboard section for a chord part; and (c) generating a new accompaniment sound based on said detected chord of said chord part and automatic accompaniment data after said step (b) when said key operation is said key pushing operation to said keyboard for said chord part.

17. The method according to claim 16, further comprising the steps of:

(d) extinguishing ones of component sounds of said currently generated accompaniment sound other than component sounds of the detected chord of said chord part when said key operation is said key releasing operation for said chord part; and (e) sustaining remaining component sounds when said key operation is said key releasing operation for said chord part.

18. The method according to claim 16, wherein said (c) generating step comprises the step of:

generating said new accompaniment sound based on said detected chord of said chord part while component sounds of a bass part are not changed, when a root sound of said chord detected in response to said key pushing operation is not changed from a root sound of a chord of said currently generated accompaniment sound.

19. The method according to claim 16, further comprising the steps of:

(f) extinguishing ones of component sounds of said currently generated accompaniment sound other than a specific component sound when said key operation is said key releasing operation to said keyboard section for a bass part; and (g) carrying out a bend operation to set a pitch of said specific sound to that of a root sound of the detected chord of said bass part, when said key operation is said key releasing operation to said keyboard section for a bass part.

20. The method according to claim 19, wherein said specific component sound is the lowest one of the component sounds of said bass part of said currently generated accompaniment sound.

* * * * *